United States Patent
Noda et al.

(10) Patent No.: US 7,953,434 B2
(45) Date of Patent: *May 31, 2011

(54) COMMUNICATIONS APPARATUS AND METHOD, STORAGE MEDIUM, AS WELL AS PROGRAM

(75) Inventors: Takuro Noda, Tokyo (JP); Yoriko Komatsuzaki, Tokyo (JP); Makoto Sato, Tokyo (JP); Hiroshi Kakuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/640,448

(22) Filed: Dec. 17, 2009

(65) Prior Publication Data

US 2010/0093286 A1 Apr. 15, 2010

Related U.S. Application Data

(63) Continuation of application No. 10/544,034, filed on Feb. 1, 2006, now Pat. No. 7,711,388.

(30) Foreign Application Priority Data

Jan. 30, 2003 (JP) ................ P2003-021974

(51) Int. Cl.
*H04B 17/00* (2006.01)
*H04B 7/24* (2006.01)
*H04B 5/00* (2006.01)
*H04B 7/00* (2006.01)
*H04W 24/00* (2009.01)
*H04M 1/00* (2006.01)
*G09G 5/00* (2006.01)

(52) U.S. Cl. ...... 455/550.1; 455/39; 455/41.1; 455/41.2; 455/41.3; 455/456.5; 455/67.11; 345/156

(58) Field of Classification Search .............. 455/39, 455/41.1, 41.2, 41.3, 63.1, 456.5, 550.1, 455/67.11; 345/156
See application file for complete search history.

(56) References Cited

U.S. PATENT DOCUMENTS 6,862,737 B1 3/2005 Iwamura et al.
(Continued)

FOREIGN PATENT DOCUMENTS

EP 1 276 337 1/2003
(Continued)

*Primary Examiner* — Lewis G West
*Assistant Examiner* — Bobbak Safaipour
(74) *Attorney, Agent, or Firm* — Finnegan, Henderson, Farabow, Garrett & Dunner, L.L.P.

(57) ABSTRACT

The present invention relates to a communications apparatus and method, a storage medium and a program that make it possible for the user to select a device to be made a communications partner more quickly and reliably. The searcher device 21 performs a search so as to detect only one device. If the response message from the searchee device 32 is obtained by the searcher device 21, on the display section of the searcher device 21 is displayed a selection screen for selecting whether or not to make the searchee device 32 a communications partner. If the searchee device 32 is not selected as a communications partner, the searcher device 21 performs another search so as to detect two devices. If the searchee device 31 and the searchee device 32 are detected in the second search, the searcher device 21 excludes the searchee device 32, which was not selected as a communications partner in the previous search, and displays a selection screen for selecting whether or not to perform communications with the searchee device 31. The present invention is applicable to various kinds of communications apparatuses, such as personal computers, PDAs, mobile phones and the like.

20 Claims, 27 Drawing Sheets

U.S. PATENT DOCUMENTS

| | | | |
|---|---|---|---|
| 7,039,445 B1 * | 5/2006 | Yoshizawa | 455/575.7 |
| 7,076,209 B2 * | 7/2006 | Sugikawa et al. | 455/41.2 |
| 7,356,347 B1 * | 4/2008 | Kammer | 455/517 |
| 7,363,036 B2 * | 4/2008 | Schreyer et al. | 455/435.1 |
| 2003/0013473 A1 | 1/2003 | Adachi et al. | |
| 2003/0092389 A1 | 5/2003 | Morimoto | |
| 2006/0166683 A1 * | 7/2006 | Sharma et al. | 455/456.5 |
| 2006/0240840 A1 * | 10/2006 | Morgan et al. | 455/456.1 |
| 2006/0252373 A1 * | 11/2006 | Huh et al. | 455/41.2 |
| 2007/0081488 A1 * | 4/2007 | Adya et al. | 370/328 |
| 2008/0160914 A1 * | 7/2008 | McRae et al. | 455/41.2 |
| 2008/0220720 A1 * | 9/2008 | Ashley et al. | 455/41.2 |
| 2009/0270034 A1 * | 10/2009 | Suzuki | 455/41.2 |

FOREIGN PATENT DOCUMENTS

| | | |
|---|---|---|
| EP | 1 278 312 | 1/2003 |
| JP | 2000-305885 | 11/2000 |
| JP | 2001-144781 | 5/2001 |
| JP | 2001-156704 | 6/2001 |
| JP | 2001-175397 | 6/2001 |
| JP | 2002-359873 | 12/2002 |
| JP | 2002-368761 | 12/2002 |
| JP | 2003-23390 | 1/2003 |
| WO | WO 02/28022 | 4/2002 |

* cited by examiner

Fig. 20A

| | DEVICE NAME | BLUETOOTH ADDRESS |
|---|---|---|
| 1 | DEVICE 31 | XXXXXX |

Fig. 20B

| | DEVICE NAME | BLUETOOTH ADDRESS |
|---|---|---|
| 1 | DEVICE 31 | XXXXXX |
| 2 | DEVICE 32 | YYYYY |

COMMUNICATIONS APPARATUS AND METHOD, STORAGE MEDIUM, AS WELL AS PROGRAM

RELATED APPLICATIONS

This is a continuation of application Ser. No. 10/544,034, filed on Feb. 1, 2006 now U.S. Pat. No. 7,711,388, which claims priority to Japanese Patent Application No. 2003-021974, filed Jan. 30, 2003, the entire contents of both of which are incorporated herein by reference.

TECHNICAL FIELD

The present invention relates to a communications apparatus and method, a storage medium, and a program, and in particular relates to a communications apparatus and method, a storage medium and a program that make it possible for the user to select a device to be made a communications partner more quickly and reliably.

BACKGROUND ART

In recent years, Bluetooth (registered trademark) is gaining attention as a means for short range wireless communications, and various enabled devices are developed and sold.

In Bluetooth communications, in starting communications, a search message for detecting devices existing in the vicinity is broadcast from a device (Bluetooth device) called a master, which controls communications, and a device which responds to that message is detected as a slave that is able to communicate with the master.

FIG. 1 is a diagram showing an example of device arrangement. In addition, FIG. 2 is a flow chart illustrating a search process performed by each of the devices in FIG. 1.

A searcher device 1 is, for example, a device that is in use by a user, and searchee devices 11 through 13 are devices that exist in the vicinity (within a range reachable by signals) of the searcher device 1.

In FIG. 1, if the user instructs the searcher device 1 to search for devices capable of communications, a search for devices existing within a predetermined range, with the searcher device 1 as the center, is performed.

In other words, in step S1 in FIG. 2, an inquiry packet, which is the search message, is broadcast by the searcher device 1, and that is received by the searchee devices 11 and 12 in steps S11 and S21, respectively. In addition, in FIG. 1, the search range of the searcher device 1 (the range reached by the signals used for transmitting the inquiry packet) is indicated with a circle in broken lines with the searcher device 1 as the center, and the searchee device 13 is outside thereof. Therefore, the inquiry packet broadcast by the searcher device 1 is not received by the searchee device 13.

In steps S12 and S22, the searchee devices 11 and 12, respectively, that received the inquiry packet transmit to the searcher device 11 a response message (FHS packet) with respect to the inquiry packet. Information, such as the Bluetooth device name, a Bluetooth address that is set as something unique to each Bluetooth device, a Bluetooth clock for achieving the synchronization of time slots for frequency hopping and the like, is included in this FHS packet.

In steps S2 and S3, the searcher device 1 receives the FHS packets transmitted from the searchee devices 11 and 12, presents the Bluetooth device names or the like included therein to the user and makes him select a device with which communications is to be established.

In other words, ordinarily, the user needs to select from a list of devices presented as existing in the vicinity a device with which communications is to be established.

As such, as a technology for automatically establishing communications and having the device itself specify a communications partner without making the user make such a selection, there is something like the one disclosed in Japanese Unexamined Patent Application Publication No. 2001-156704 (hereinafter referred to as Patent Document 1).

In Patent Document 1, there is disclosed a technology where the intensity of signals transmitted from a plurality of devices detected through a search is each detected, and the device that transmits the signal with the highest intensity is specified as a communications partner device. Since a communications establishment process that ensues is performed automatically with the device that is specified as a communications partner, the user is able to establish communications with that device by merely bringing his own device closer to the device that is to be the communications partner.

However, with the technology disclosed in Patent Document 1, there is a problem in that since the device transmitting signals of the highest intensity is selected as a communications partner device, depending on objects in the surroundings that reflect radio waves or on communications characteristics of the detected devices, communications are sometimes initiated automatically with a device other than the device with which the user is trying to initiate communications.

In other words, the range and intensity of signals of each of the devices do vary to some extent, and it is not necessarily the case that the signal with the highest intensity would be received from the device at the closest location.

DISCLOSURE OF THE INVENTION

The present invention is made in view of such circumstances, and seeks to make it possible to more quickly and reliably select a device to be made a communications partner from a plurality of devices detected through a search.

A communications apparatus of the present invention includes search means that searches, through wireless communications, for devices existing within a range reachable by signals, display control means that displays a first selection screen for selecting whether or not to make a first device found by the search means a communications partner, memory means that stores identification information of the first device if, through the first selection screen displayed by the display control means, the first device is not selected as its own communications partner, and is characterized in that if the first device is not selected as a communications partner, the search means performs a search again, and the display control means excludes, based on the identification information stored in the memory means, the first device from the devices detected through the search performed again, and displays a second selection screen for selecting whether or not to make a second device detected through the search performed again a communications partner.

The communications apparatus of the present invention may further include communications control means that performs subsequent wireless communications with the first device or the second device as the communications partner if the first device is selected as a communications partner through the first selection screen or if the second device is selected as a communications partner through the second selection screen.

If a plurality of devices are simultaneously detected through the search performed by the search means, the display control means may display the first or the second selection screen with one of the plurality of devices as the first or the second device.

If a plurality of devices are simultaneously detected through the search performed by the search means, the display control means may display the first or the second selection screen with, of the plurality of devices, the device detected first as the first or the second device.

The communications apparatus of the present invention may further include detection means that detects reception intensity, at the communications apparatus, of signals transmitted from the devices detected through the search. In this case, based on the detection result by the detection means, the display control means displays the first or the second selection screen with a device that transmits signals of an intensity of or above a predetermined threshold value as the first or the second device.

If a plurality of devices are simultaneously detected through the search performed by the search means, based on the detection result by the detection means, the display control means may display the first or the second selection screen with, of the plurality of devices, the device that transmits the signal of the highest intensity as the first or the second device.

The memory means may store identification information of all the devices that were not selected as a communications partner.

The search means may control the search range such that the search range for the second search and onward is wider than the search range for the first search.

A communications method of a communications apparatus of the present invention includes a search step that searches, through wireless communications, for devices existing within a range reachable by signals, a display control step that displays a first selection screen for selecting whether or not to make a first device found through the process of the search step a communications partner, a memory step that stores identification information of the first device if, through the first selection screen displayed through the process of the display control step, the first device is not selected as its own communications partner, and is characterized in that if the first device is not selected as a communications partner, a search is performed again through the process of the search step, and through the process of the display control step the first device is excluded, based on the identification information stored through the process of the memory step, from the devices detected through the search performed again, and a second selection screen for selecting whether or not to make a second device detected through the search performed again a communications partner is displayed.

A program recorded on a storage medium of the present invention as well as a program of the present invention include a search step that searches, through wireless communications, for devices existing within a range reachable by signals, a display control step that displays a first selection screen for selecting whether or not to make a first device found through the process of the search step a communications partner, a memory step that stores identification information of the first device if, through the first selection screen displayed through the process of the display control step, the first device is not selected as its own communications partner, and is characterized in that if the first device is not selected as a communications partner, a search is performed again through the process of the search step, and through the process of the display control step the first device is excluded, based on the identification information stored through the process of the memory step, from the devices detected through the search performed again, and a second selection screen for selecting whether or not to make a second device detected through the search performed again a communications partner is displayed.

In the communications apparatus and method, as well as the program of the present invention, devices existing within the signal range are searched for through wireless communications, and the first selection screen for selecting whether or not to make the first device that is found the communications partner is displayed. In addition, in the first selection screen, if the first device is not selected as its own communications partner, identification information of the first device is stored. Further, if the first device is not selected as the communications partner, a search is performed again, the first device is excluded, based on the identification information, from the devices detected through the search performed again, and the second selection screen for selecting whether or not to make the second device detected through the search performed again the communications partner is displayed.

BRIEF DESCRIPTION OF THE DRAWINGS

FIG. 20A is a diagram showing an example of a revocation list;

FIG. 20B is a diagram showing an example of the revocation list;

BEST MODES FOR CARRYING OUT THE INVENTION

Figure 1:
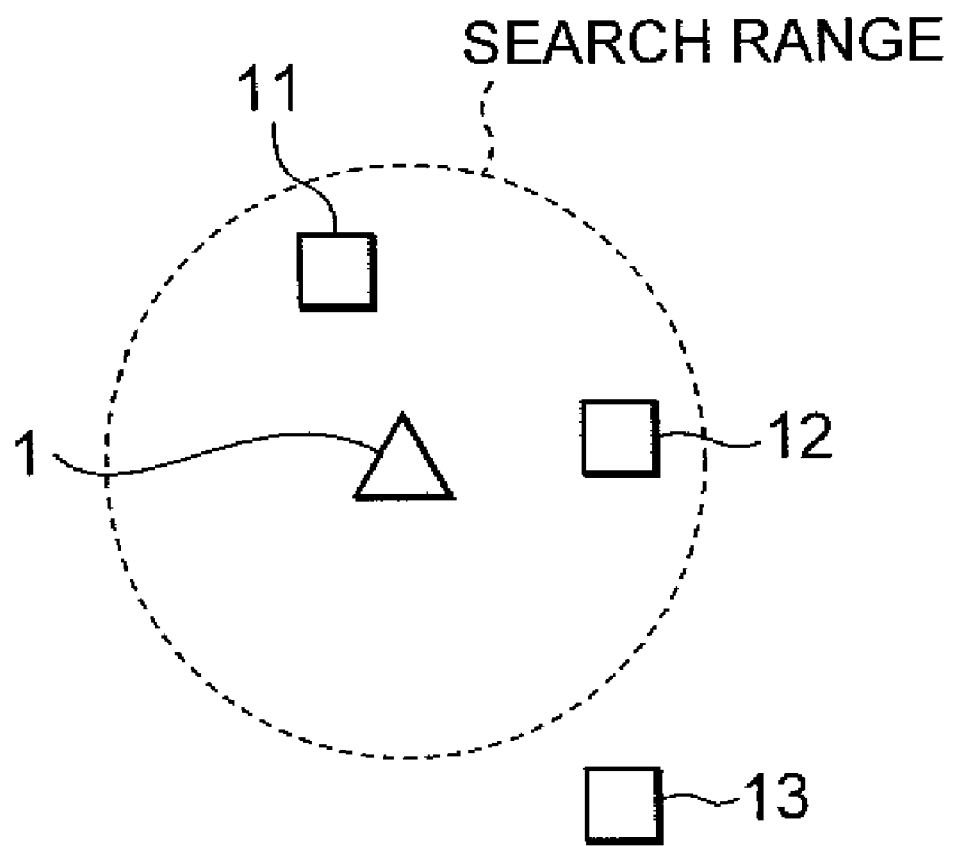
FIG. 1 is a diagram showing a device arrangement example.
Figure 2:
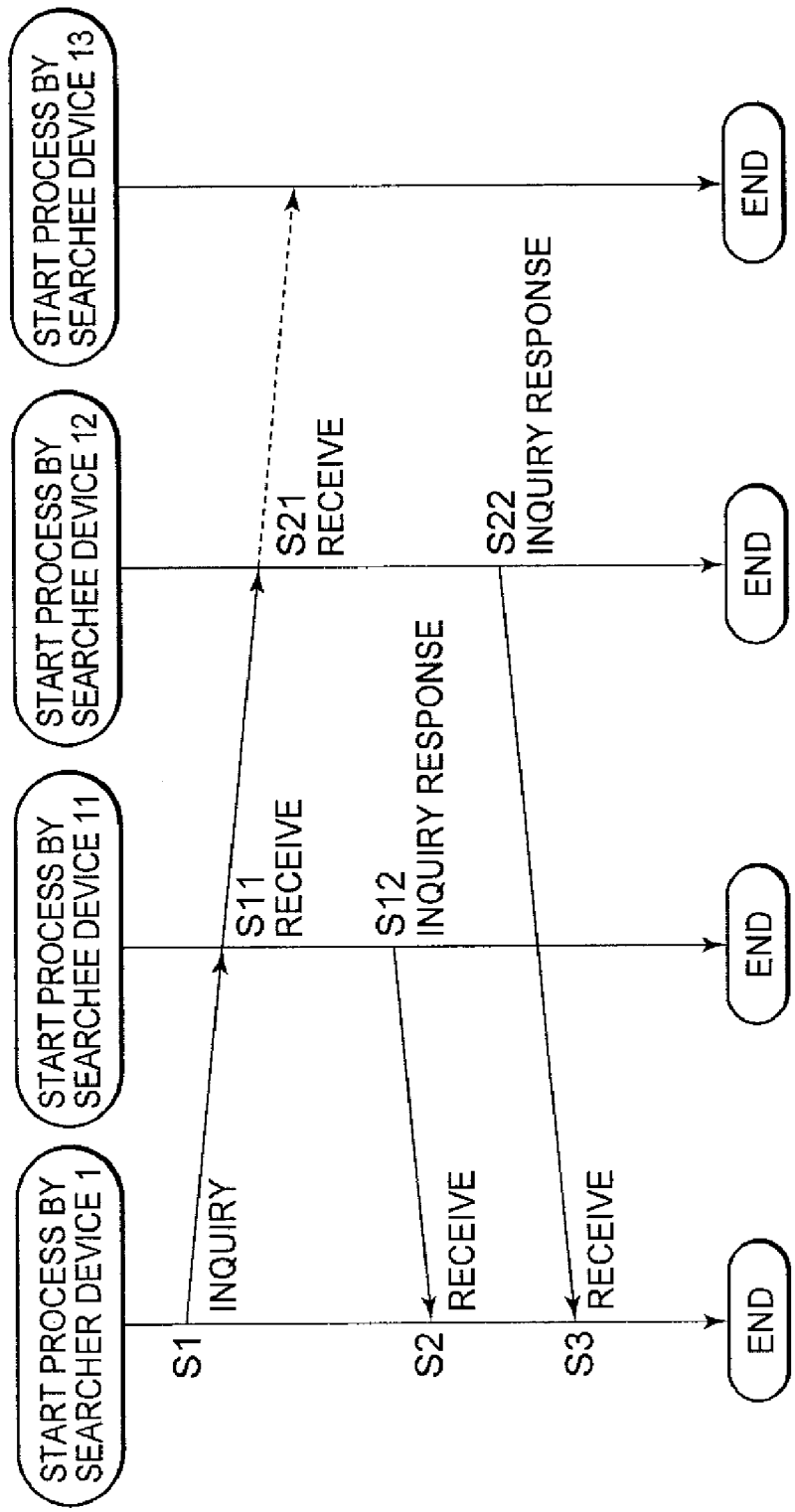
FIG. 2 is a flow chart illustrating a conventional search process performed between each of the devices in FIG. 1.
Figure 3:
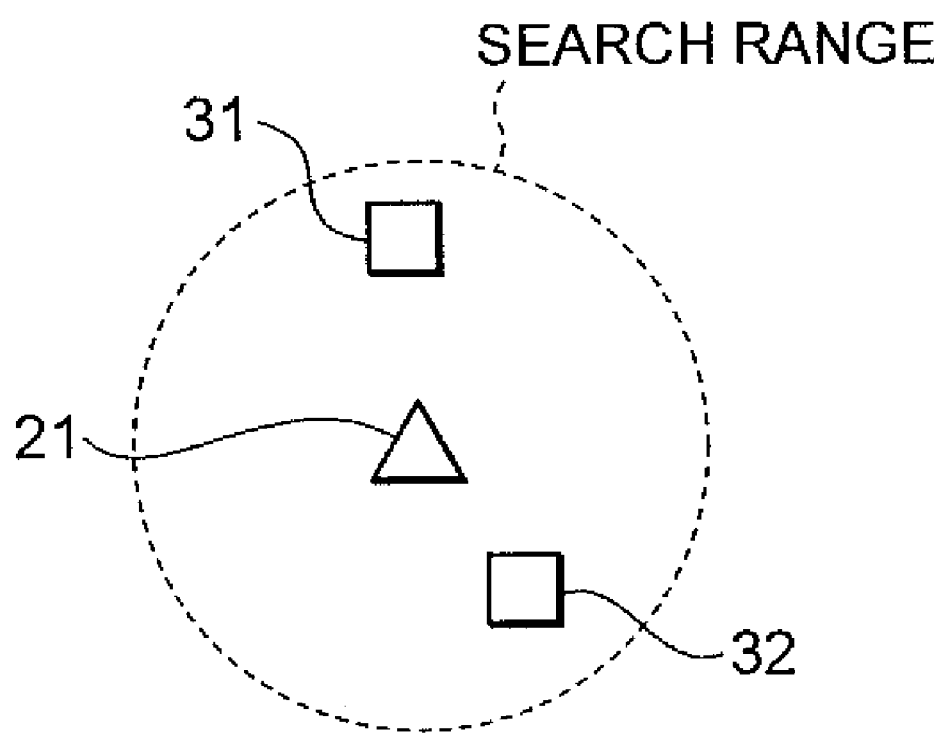
FIG. 3 is a diagram showing an arrangement example of each device.

FIG. 3 is a diagram showing an arrangement example of each device including a searcher device (communications apparatus) 21 to which the present invention is applied.

The searcher device 21 is a device that is capable of Bluetooth communications. In a predetermined timing, the searcher device 21 operates, for example, as a master in Bluetooth communications, and performs Bluetooth communications with a device that is selected as a communications partner from among devices detected through a search.

Searchee devices 31 and 32 are, like the searcher device 21, devices that are capable of Bluetooth communications. In addition, in FIG. 3, the search range (the range reached by signals used in searches) of the searcher device 21 is indicated with a circle in broken lines with the searcher device 21 as the center, and the searchee devices 31 and 32 exist therein.

These searcher device 21, searchee device 31 and searchee device 32 may be, for example, various devices such as personal computers, mobiles phones, PDAs (Personal Digital Assistants) and the like.

If a user instructs the searcher device 21 to perform a search for communicable devices, an inquiry packet as defined by the Bluetooth communications standard is broadcast as a search message by the searcher device 21, and that is received by each of the searchee devices 31 and 32.

The searchee devices 31 and 32 that received the inquiry packet each transmit to the searcher device 21 a response message (FHS packet) with respect to the inquiry packet. In this FHS packet is included information, such as the Bluetooth device name, the Bluetooth address that is uniquely set for each Bluetooth device, a Bluetooth clock for performing communications by frequency hopping.

Based on the response messages transmitted from the searchee devices 31 and 32, the searcher device 21 displays a selection screen for making the user select whether or not to select the searchee device 31 or 32 as a communications partner device. If through this screen it is selected that communications is to be performed with the searchee device 31 or 32, the searcher device 21 performs a predetermined authentication process and the like with the selected device, and Bluetooth communications is established.

For example, the response message transmitted from the searchee device 32 that is at a closer location with respect to the searcher device 21 is received by the searcher device 21 before the response message transmitted from the searchee device 31. In this case, on the display section of the searcher device 21 is displayed a selection screen for selecting whether or not to make the searchee device 32 a communications partner.

On the selection screen are displayed, for example, a message asking whether or not to perform communications with the searchee device 32 along with the Bluetooth device name set for the searchee device 32 and the like. In addition, such information as Bluetooth address, property (type) of the device, providable service (profile) and the like may also be displayed on the selection screen.

On the other hand, if the searchee device 32 presented on the selection screen is not selected as a communications partner device by the user, that is, if the user desires communications with the searchee device 31, the searcher device 21 performs another search. In the search performed at this point, if each device has not moved from its location, the searchee device 31 and the searchee device 32 located within the search range are detected as in the immediately preceding search. At this point, from among the searchee device 31 and the searchee device 32, the searcher device 21 displays a selection screen for the searchee device 31 (a selection screen for selecting whether or not to perform communications with the searchee device 31) that is different from the searchee device 32 that was not selected as a communications partner in the immediately preceding search.

Thus, since communications partner candidates (devices) are presented sequentially one by one, just by selecting whether or not to perform communications with the presented device, the user is able to initiate communications with that device. In other words, the user is able to more quickly and reliably initiate Bluetooth communications with the desired device.

Hypothetically, if it were the case that the device that transmits the most intense signal or the device that transmits a response message first is automatically specified as a communications partner, the device closest in location to the user's device may not necessarily be specified as a communications partner, and depending on the communications environment or the communications characteristics of the device, some other device may become a communications partner. However, according to the present invention, it is possible to prevent such situations.

In addition, compared to a case where a list of a plurality of detected devices is displayed and the device to be a communications partner is selected therefrom, the user is able to select a communications partner device more efficiently. For example, if the number of devices displayed on a list were two or three, selecting a communications partner device would not be too difficult. However, if ten or twenty devices are detected from a search, selecting a communications partner device therefrom becomes rather difficult.

Figure 4:
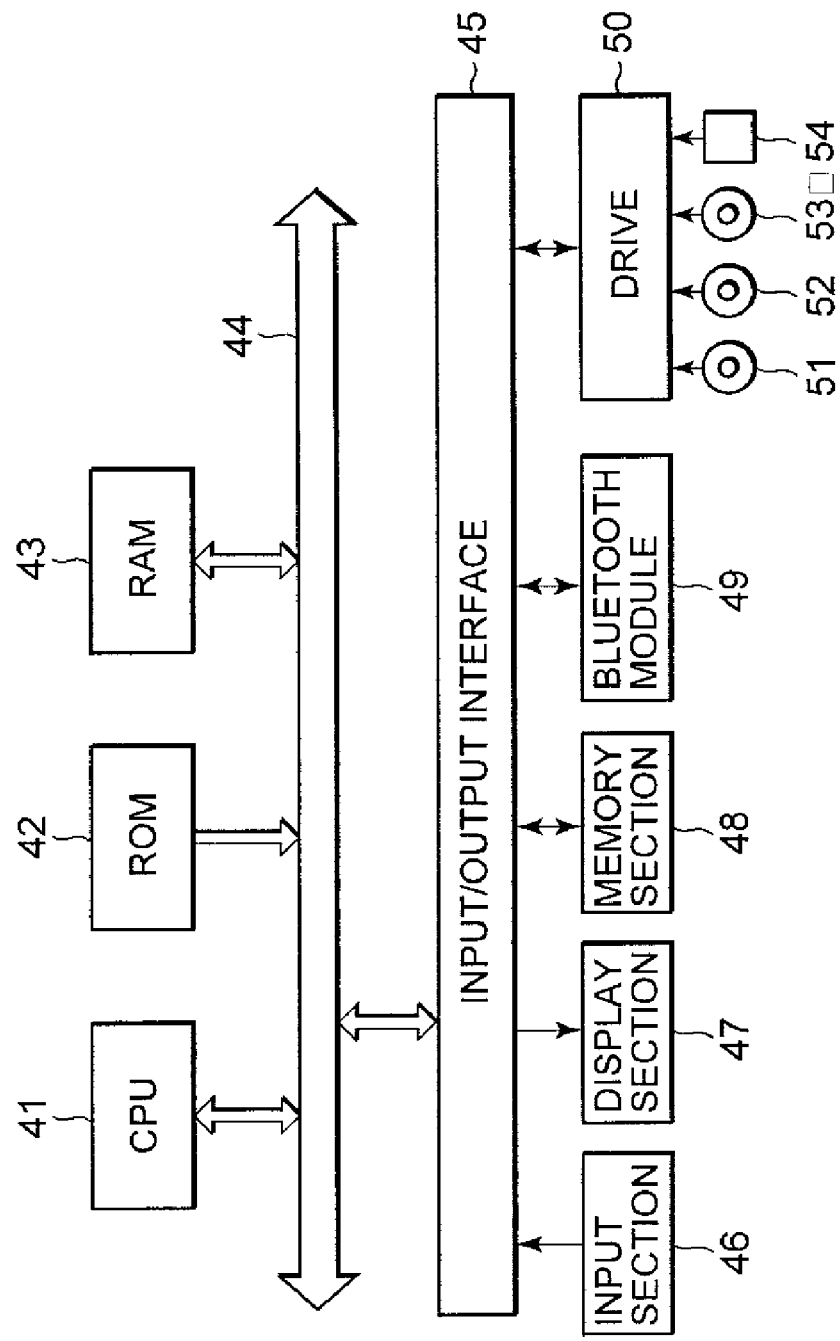
FIG. 4 is a block diagram showing a configuration example of a searcher device.

FIG. 4 is a block diagram showing a configuration example of the searcher device 21.

A CPU (Central Processing Unit) 41 executes various processes in accordance with programs stored in a ROM (Read Only Memory) 42 or with programs loaded to a RAM (Random Access Memory) 43 from a memory section 48. In addition, data that is necessary for the CPU 41 to execute various processes is stored in the RAM 43 when appropriate.

The CPU 41, the ROM 42, and the RAM 43 are interconnected via a bus 44. An input/output interface 45 is also connected to this bus 44.

An input section 46 including a keyboard, a mouse and the like, and a display section 47 including an LCD (Liquid Crystal Display) and the like are connected to the input/output interface 45. In addition, the memory section 48 including a hard disk, flash memory and the like, and a Bluetooth module 49 that performs Bluetooth communications with other devices are connected to the input/output interface 45.

In addition, a drive 50 is connected to the input/output interface 45 as required, and a magnetic disk 51, an optical disc 52, a magneto-optical disc 53, a semiconductor memory 54 or the like is loaded thereto when appropriate. Computer programs and contents read from the magnetic disk 51, the optical disc 52, the magneto-optical disc 53, or the semiconductor memory 54 are installed in the memory section 48 as required.

It is to be noted that the configuration of the searchee devices 31 and 32 in FIG. 3 are essentially similar to the configuration shown in FIG. 4. Therefore, hereinafter, FIG. 4 will also be cited, as necessary, as the configuration of the searchee devices 31 and 32, as well as of later described devices other than the searcher device 21.

Figure 5:
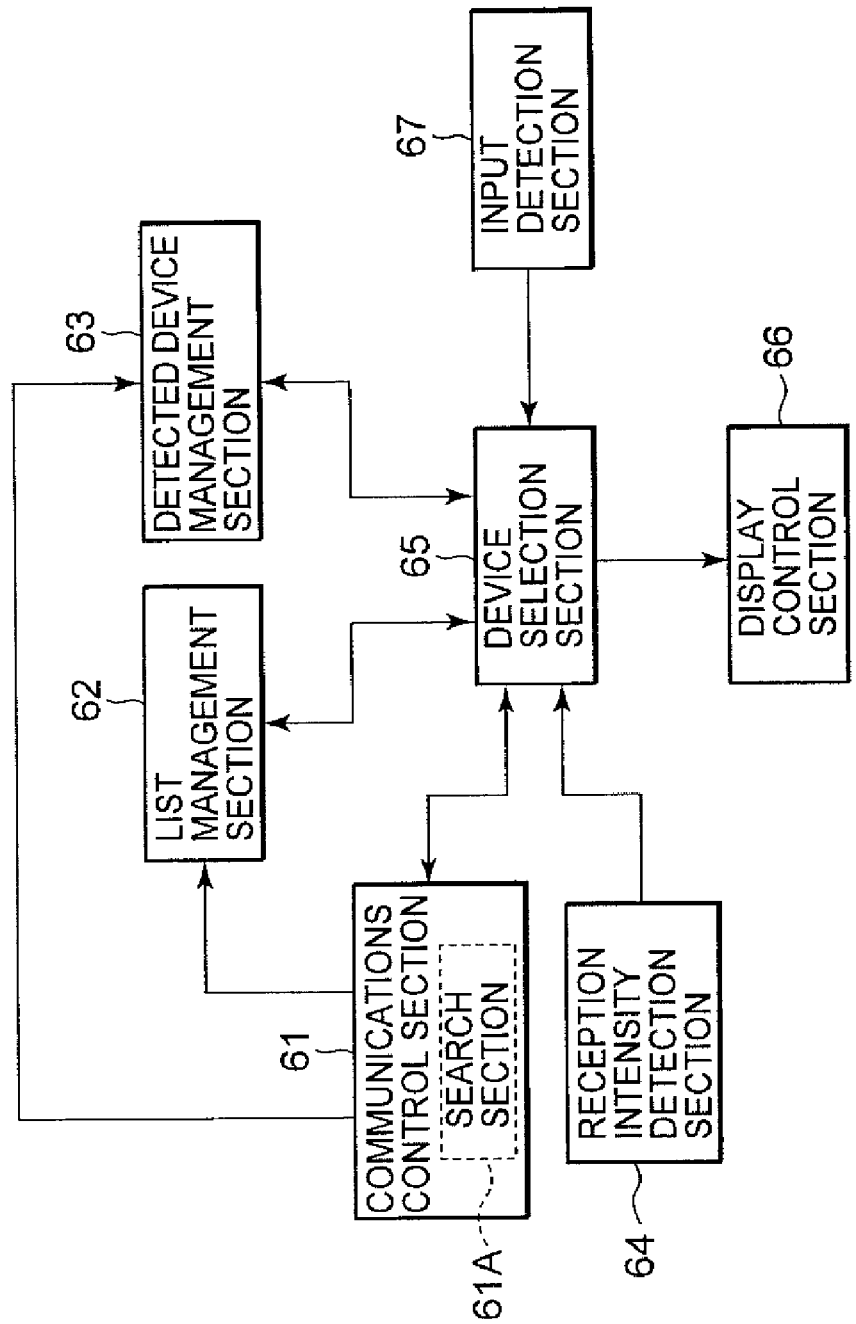
FIG. 5 is a block diagram showing a functional configuration example of the searcher device.

FIG. 5 is a block diagram showing a functional configuration example of the searcher device 21. Each component in FIG. 5 is realized by having, for example, a control program stored in the ROM 42 executed by the CPU 41.

A communications control section 61 controls the Bluetooth module 49, and controls Bluetooth communications. For example, the Bluetooth module 49 performs a process of establishing what is referred to as intra-piconet synchronization in the Bluetooth communications standard with the device that is selected as a communications partner.

Below, Bluetooth communications will be described.

Forms of networks in Bluetooth communications include piconets and scatternets in which a plurality of piconets are interconnected. In each of the piconets exist Bluetooth devices that take on roles referred to as master and slave.

In order to establish synchronization within a piconet and transmit and receive various kinds of information, it is necessary for the synchronization of the frequency axis and the time axis to be established between the master and the slaves (for example, between the searcher device 21 and the searchee devices 31 and 32) forming the piconet.

In Bluetooth communications, using a frequency width of 79 MHz, a signal, for example, is transmitted from a master to a slave. In so doing, the master does not transmit information by occupying the frequency width of 79 MHz at once, but instead transmits by randomly changing (hopping) the transmission frequency for the information by a frequency width of 1 MHz.

On the other hand, the slave on the receiving end synchronizes with the transmission frequency of the master that is changed randomly, and receives information transmitted from the master by appropriately changing the reception frequency.

The pattern of frequencies changed by the master and the slave is referred to as the frequency hopping pattern, and a state in which the frequency hopping pattern is shared between the master and the slave is defined as a state where synchronization of the frequency axis is established.

In addition, in Bluetooth communications, in order for a master and a plurality of slaves to perform communications, the communications path (channel) between the master and each slave is time division multiplexed in units of 625μ seconds. These time intervals in units of 625μ seconds are called time slots, and a state in which time slots are shared between the master and the slave is defined as a state where synchronization of the time axis is established.

In addition, all slaves compute the frequency hopping pattern based on the Bluetooth address of the master, add, based on the Bluetooth clock of the master, an off-set to Bluetooth clocks they manage themselves, and time the time slots.

This Bluetooth address is represented by 48 bits that are unique with respect to each Bluetooth device, and the Bluetooth clock is individually managed by all Bluetooth devices. More specifically, the Bluetooth address is separated such that its lower 24 bits are the LAP (Low Address Part), the subsequent 8 bits the UAP (Upper Address Part), and the remaining 16 bits the NAP (Non-significant Address Part). In computing the frequency hopping pattern, 28 bits including the 24 bits of the entire LAP and the lower 4 bits of the UAP are used.

Therefore, prior to forming a piconet, through the above-described "inquiry" and "paging," various information including Bluetooth address and Bluetooth clock is transmitted and received between the master and the slave.

Thus, synchronization is established by the communications control section 61 in FIG. 5, and then, wireless communications using the 2.4 GHz band is performed between devices for which synchronization is established. In addition, the device search process by inquiry and paging is performed by a search section 61A included in the communications control section 61.

Device information (information including the above-mentioned Bluetooth device name, Bluetooth address, Bluetooth clock, device property, provided service and the like) for the device detected by the search section 61A is outputted, as required, to a list management section 62, a detected device management section 63, and a device selection section 65.

The list management section 62 manages a list of information for, of the devices detected through a search, the device that was not selected as a communications partner by the user. For example, a device that is registered on this list upon the first search (a device that is not selected as a communications partner despite being detected through the first search and presented to the user) is excluded from the devices displayed on the selection screen even if detected again in the second search. Therefore, of the devices detected in the second search, only devices that are different from the devices registered on the list are presented to the user as devices detected through the second search. Hereinafter, the list managed by the list management section 62 will be referred to as a revocation list where appropriate.

The list management section 62 retains the revocation list during the sequence of the search process from starting a search till selecting a device to be a communications partner or during the sequence of the search process from starting a search till the termination of the search due to a predetermined cause. Therefore, if a plurality of searches are performed, and the devices presented to the user sequentially are repeatedly not selected as a communications partner, device information for those devices are registered on the revocation list.

The information registered on the revocation list is, for example, initialized in a predetermined timing such as when starting the sequence of the search process and so forth. Thus, not being able to select as a communications partner a device that is registered on the revocation list once can be prevented.

The detected device management section 63 manages information of devices that are detected in the immediately preceding search and not selected as a communications partner. In other words, while all information of the plurality of devices that are not selected as a communications partner in the sequence of the search process is managed in the list management section 62, only the information of the one device that is detected in the immediately preceding search and not selected as a communications partner is managed in the detected device management section 63.

The information managed by the list management section 62 and the detected device management section 63 is referenced by the device selection section 65 when appropriate.

A reception intensity detection section 64 detects the intensity of the signals received at the Bluetooth module 49 from other devices. As will be described in detail later, for example, if the intensity of the signal used in transmitting a response message with respect to a search is lower than a predetermined threshold intensity, the device that transmits that signal is excluded from the devices presented on the selection screen. In other words, a device to be presented on the selection screen is selected from devices that transmit a signal of an intensity higher than the threshold value. Information representing the reception intensity detected by the reception intensity detection section 64 is outputted to the device selection section 65.

The device selection section 65 references the information managed by the list management section 62 and the detected device management section 63 or the reception intensity information supplied from the reception intensity detection section 64, and selects from the detected devices one device to be presented to the user. In addition, the device selection section 65 instructs a display control section 66 to display the selected device on the selection screen. Based on an output from an input detection section 67, if it is determined that a device to be made a communications partner is selected, the device selection section 65 notifies that to the communications control section 61, and makes it perform Bluetooth communications with the selected device.

Based on the information from the device selection section 65, the display control section 66 displays on the display section 47 a selection screen for prompting the selection as to whether or not to perform communications with a predetermined device. The input detection section 67 detects user input with respect to the input section 46 and outputs corresponding signals to the device selection section 65.

Next, operations of each device, including the searcher device 21 having the configuration above, will be described.

First, with reference to the flow chart in FIG. 6, processes performed by the searcher device 21, the searchee device 31 and the searchee device 32 in FIG. 3 will be described.

Figure 6:
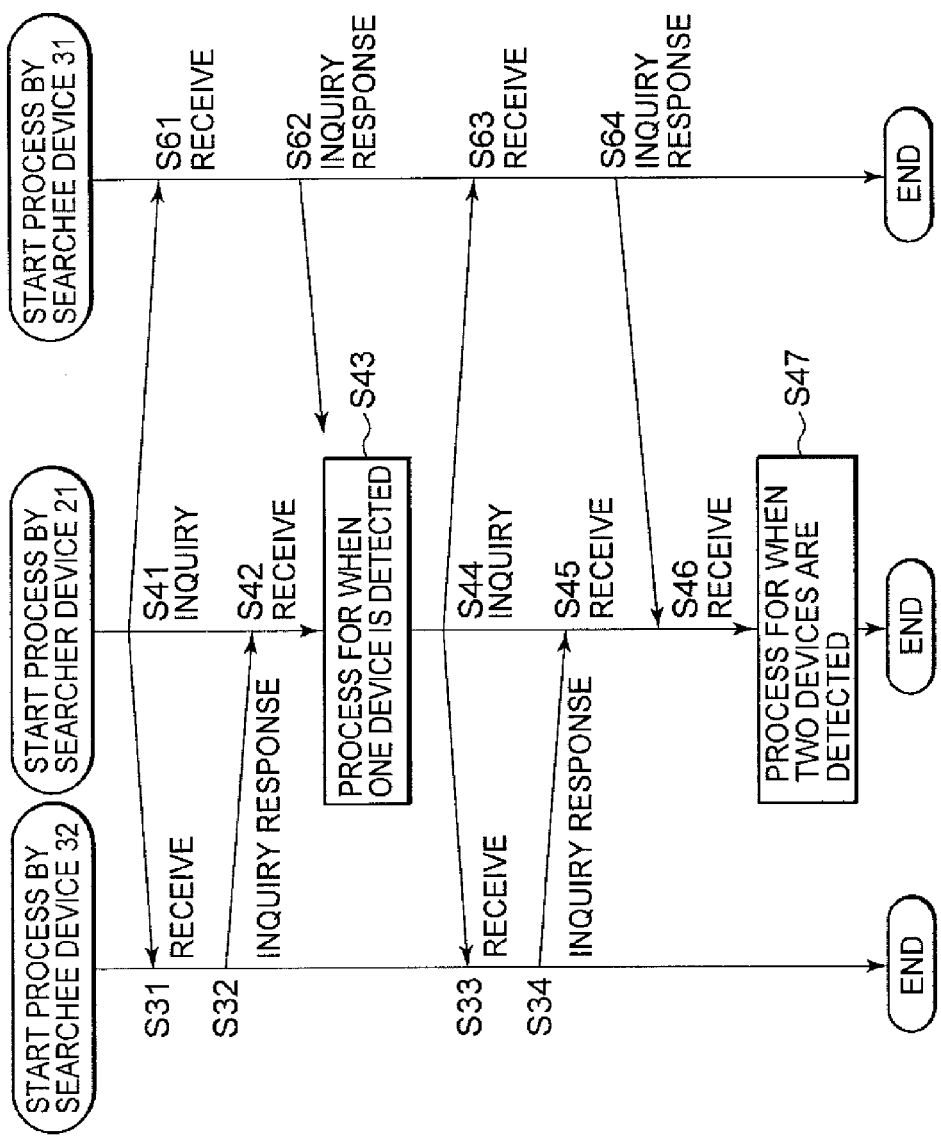
FIG. 6 is a flow chart illustrating processes performed by each of the devices in FIG. 3.

In FIG. 6, the gap between the flow chart related to the process by the searcher device 21 and the flow chart related to the process by the searchee device 32 is drawn narrower than the gap between the flow chart related to the process by the searcher device 21 and the flow chart related to the process by the searchee device 31. This represents the fact that, as shown in FIG. 3, the searchee device 32 is at a location closer to the searcher device 21 than is the searchee device 31. Similarly, in the later described flow charts of the processes by each of the devices, the gaps shown in the diagrams are representative of the positional relationship of each device with respect to the searcher device 21.

When the execution of a search is instructed by the user, the searcher device 21 controls the Bluetooth module 49 and broadcasts an inquiry packet in step S41. The broadcasting of an inquiry packet (the device search) performed at this point is so performed as to detect only one device.

The inquiry packet broadcast by the searcher device 21 is first received in step S31 by the searchee device 32 that is at a closer location with respect to the searcher device 21, and then in step S61, is received by the searchee device 31.

In step S32, the searchee device 32 transmits to the searcher device 21 a response message (FHS packet) with respect to the inquiry packet.

In step S42, the searcher device 21 receives the response message transmitted from the searchee device 31, proceeds to step S43, and performs a process for when one device is detected. As will be described in detail later, as a process for when one device is detected, for example, the searchee device 32 detected through the search is presented on the selection screen for selecting a communications partner. Then, if the searchee device 32 is not selected as a communications partner by the user, device information of the searchee device 32 is managed by the detected device management section 63.

Figure 7A:
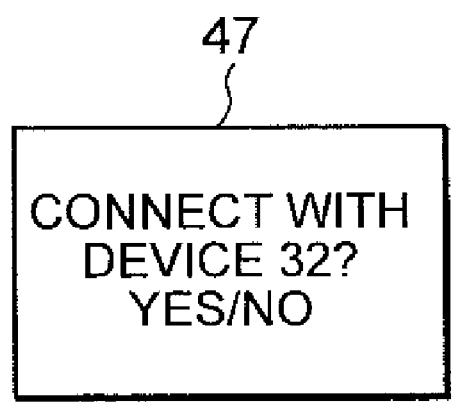
FIG. 7A is a diagram showing an example of a screen displayed on a display section.

FIG. 7A is a diagram showing an example of a selection screen displayed on the display section 47 during the process for when one device is detected.

For example, the FHS packet transmitted from the searchee device 32 is referenced, and as shown in the diagram, a screen for selecting whether or not to connect with "device 32 (Bluetooth device name)" is displayed. For example, if communications with the searchee device 31 is desired, the user selects "No" in response to the displaying of the screen in FIG. 7A.

In addition, in step S62, a response with respect to the search is performed by the searchee device 31 as well, but since the search performed in step S41 is so performed as to detect only one device, a process with respect to the response from the searchee device 31 is not performed at this point.

In the displayed selection screen, if the searchee device 32 is not selected as a communications partner, proceeding to step S44, the searcher device 21 performs another search. The search performed at this point is so performed as to detect two devices, incrementing the previous number of search subjects by one.

The inquiry packet broadcast by the searcher device 21 is received by the searchee device 32 in step S33, and is received by the searchee device 31 in step S63.

In step S34, the searchee device 32 transmits to the searcher device 21 a response message with respect to the inquiry packet. In addition, in step S64, the searchee device 31 transmits to the searcher device 21 a response message with respect to the inquiry packet.

The response message from the searchee device 32, as well as the response message from the searchee device 31 are received by the searcher device 21 in steps S45 and S46, respectively.

Thus, in the search in step S44, since two devices are taken to be detection subjects, the searcher device 21, unlike in the search in step S41, waits until it receives a response message from the searchee device 31 (a response message from the second device) instead of performing a process with respect to the response immediately after receiving the response message from the searchee device 32.

In step S47, the searcher device 21 performs a process for when two devices are detected. As will be described in detail later, for example, based on the information managed by the detected device management section 63, the searcher device 21 excludes the searchee device 32, which was not selected as a communications partner in the previous search, from the searchee device 31 and the searchee device 32 detected in the second search, and displays a selection screen for selecting whether or not to perform communications with the searchee device 31.

Figure 7B:
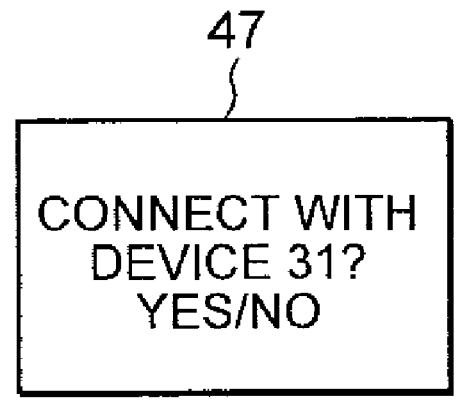
FIG. 7B is a diagram showing an example of a screen displayed on the display section.

FIG. 7B is a diagram showing an example of a selection screen displayed on the display section 47 in the process for when two devices are detected.

As shown in the diagram, of the searchee device 31 and the searchee device 32 detected in the second search, a selection screen for selecting whether or not to connect with the searchee device 31, which is different from the searchee device 32 that was not selected as a communications partner in the previous search, is displayed. If communications with the searchee device 31 is desired, the user selects "Yes" with respect to the screen displayed at this point, and selects the searchee device 31 as a communications partner.

Then, various processes, such as an authentication process and the like, are performed between the searcher device 21 and the searchee device 31, and Bluetooth communications is established.

Thus, since from the devices detected through a search, devices for which a selection to not make them a communications partner is already made are excluded and the remaining one device is presented, the user is able to select a communications partner more quickly as compared to a case where a list of all detected devices is displayed and a communications partner is to be selected therefrom. In addition, since he need only select whether or not to connect ("Yes" or "No") with respect to the displayed message (selection screen), the selecting of a wrong device can be prevented. In other words, the user is able to select a communications partner reliably.

Next, with reference to the flow chart in FIG. 8, details of the process by the searcher device 21 described with reference to FIG. 6 will be described.

In step S81, the communications control section 61 so performs a search that only one device is detected. In other words, the Bluetooth module 49 is controlled by the communications control section 61 and an inquiry packet is broadcast.

The communications control section 61 monitors the reception status at the Bluetooth module 49, and in step S82 determines whether or not a device is detected. In step S82, if, for example, there is no response from a device despite the fact that a predetermined time has elapsed and the communications control section 61 determines that a device is not detected, proceeding to step S83, the search is deemed a failure, and the process is then terminated. Here, as an error process for when a search has failed, for example, a screen notifying that there are no devices in the vicinity is displayed on the display section 47.

In step S82, if it is determined that a device is detected, the communications control section 61 proceeds to step S84, and displays on the display section 47 a selection screen for selecting whether or not to perform communications with the detected device. In other words, based on the Bluetooth device name and the like included in the FHS packet acquired by the communications control section 61, the device selection section 65 instructs the display control section 66 to present the detected device to the user. For example, if the searchee device 32 is detected, the screen in FIG. 7A described above is displayed on the display section 47 by the display control section 66.

In step S85, based on the output from the input detection section 67, the device selection section 65 determines whether or not the device presented in step S84 is selected by the user as a device with which communications is desired. If, for example, it is determined that the detected device is selected as a device with which communications is desired because "Yes" is selected on the selection screen in FIG. 7A, the device selection section 65 proceeds to step S86, deems the search a success, and then terminates the process. Then, a process, such as a predetermined authentication process and the like, for establishing Bluetooth communications is performed.

On the other hand, if in step S85 the device selection section 65 determines that the device presented in step S84 is not selected as a device with which communications is desired (if "No" is selected on the screen in FIG. 7A), it proceeds to step S87.

In step S87, the detected device management section 63 stores the device information (information including identification information such as the Bluetooth address and the like) for the device that was detected in the immediately preceding search and not selected as a communications partner. The device information is supplied to the detected device management section 63 from the communications control section 61.

In step S88, the communications control section 61 next performs a search so that two devices are detected, proceeds to step S89, and determines whether or not a device is detected. If it is determined that a device is not detected because there is no response from a device, the communications control section 61 proceeds to step S83, deems the search a failure, and then terminates the process.

On the other hand, if in step S89 it is determined that a device is detected, the communications control section 61 proceeds to step S90. Information regarding the detected device is outputted to the device selection section 65.

In step S90, based on the information supplied from the communications control section 61 and the information managed by the detected device management section 63 (information on the device that was not selected as a communications partner in the previous search (the search performed in S81)), the device selection section 65 determines whether or not the device detected first in the present search is a device different from the device detected in the previous search.

If in step S90 it is determined that the device detected first in the present search is the device that was detected in the previous search, the device selection section 65 proceeds to step S91, and selects the device detected second in the present search, that is, the device different from the device detected in the previous search.

In addition, the device selection section 65 proceeds to step S92, and presents to the user the device selected in step S91 (the device that is different from the device detected in the previous search). Thus, for example, in a case where the searchee device 31 and the searchee device 32 are detected through the search performed in step S88, and where the searchee device 32 of those two has already been selected by the user as not being a communications partner, the selection screen in FIG. 7B presenting the searchee device 31 is displayed on the display section 47.

On the other hand, in step S90, if it is determined that a device that is different from the device detected in the previous search is detected first in the present search, the device selection section 65 proceeds to step S92, and presents to the user the device different from the device detected in the previous search.

Then, when the process from step S85 and onward is executed, and the searchee device 31 is selected as a communications partner on the screen in FIG. 7B, the search is deemed a success in step S86, and the process is then terminated.

In addition, if the two devices detected in the second search are both devices that are different from the device detected in the first search, the device detected first, for example, is given priority and presented to the user. Thus, though it does depend on the communications environment, a device that is at a closer location to the searcher device 21 ends up being presented, and a device that is more likely to be selected as a communications partner can be presented to the user at an earlier point. In other words, the sequence of the search process can be terminated more quickly.

In addition, by terminating the search process quickly, it is possible to suppress battery loss of the searcher device 21 used in the search.

In the description above, a case in which several searches are performed by the searcher device 21 with the arrangement shown in FIG. 3 intact is described. However, next, a process for a case in which after the first search is performed and before subsequent searches are performed, the positional relationship of each device is changed will be described.

Figure 9:
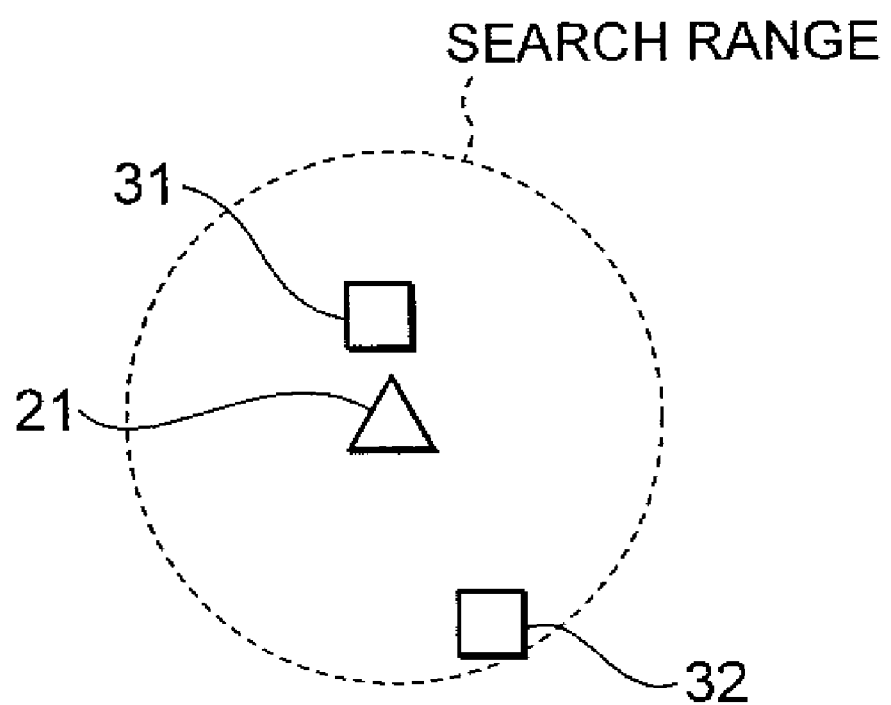
FIG. 9 is a diagram showing an arrangement example of each device.

FIG. 9 is a diagram showing an arrangement example of each device after the searcher device 21 has moved. As shown in the diagram, as compared to the case in FIG. 3, the gap between the searcher device 21 and the searchee device 32 is wider, and the gap between the searcher device 21 and the searchee device 31 is narrower.

At this point, with reference to the flow chart in FIG. 10, processes by each device in a case where the arrangement of each device is switched from the arrangement shown in FIG. 3 to the arrangement shown in FIG. 9 between the first search and the second search will be described.

Figure 10:
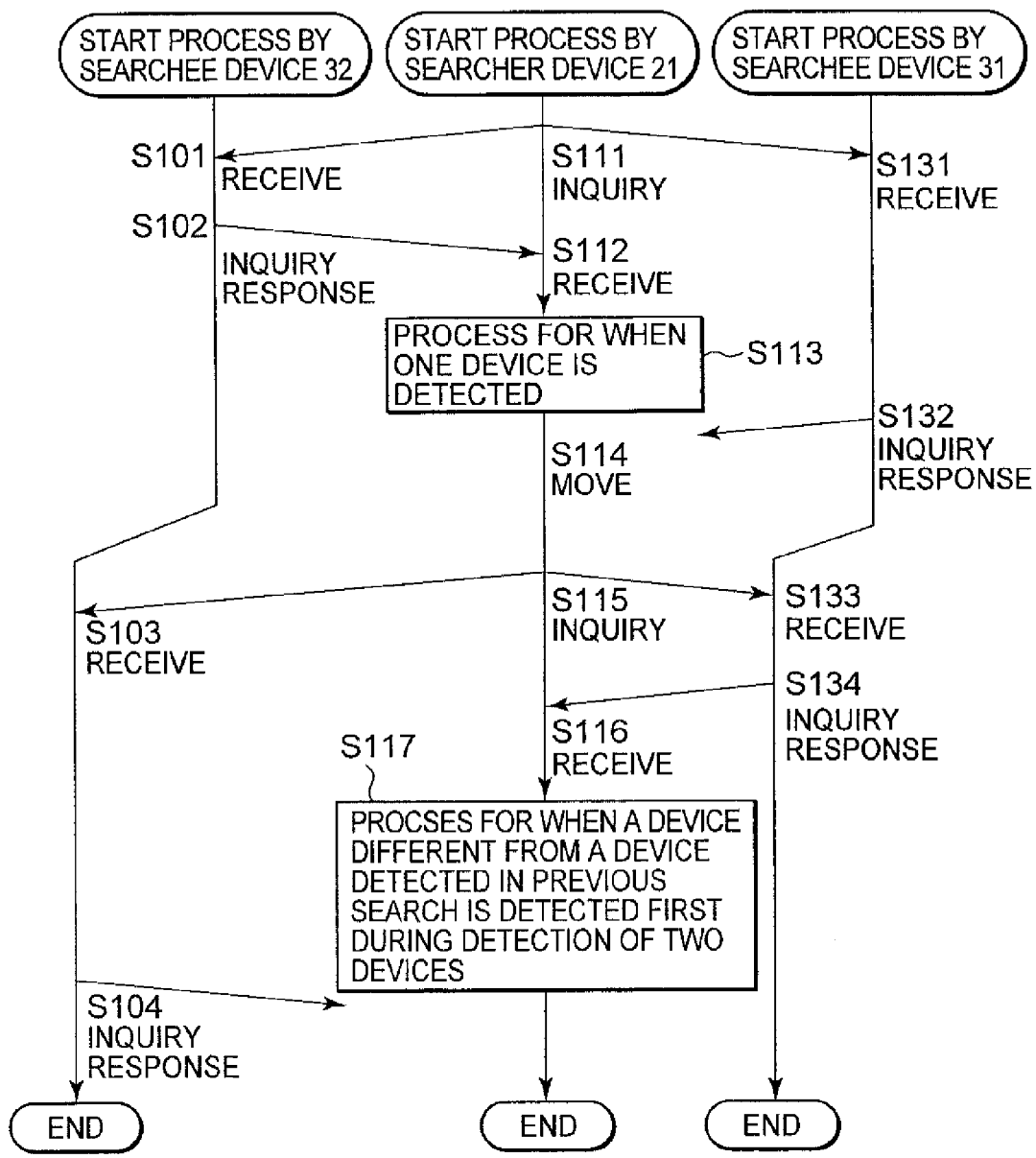
FIG. 10 is a flow chart illustrating processes performed by each of the devices in FIG. 9.

The process of steps S101 and S102 (the process by the searchee device 32), the process of steps S111 and S113 (the process by the searcher device 21) and the process of steps S131 and S132 (the process by the searchee device 31) in FIG. 10 are similar to the processes described with reference to FIG. 6. In other words, the searchee device 32 that transmitted a response message first in the first search is presented, and a selection to not make the searchee device 32 a communications partner is made by the user.

In step S114, the position of the searcher device 21 moves and each device is arranged at the position shown in FIG. 9.

In step S115, the searcher device 21 next performs a search so that two device are detected. The inquiry packet transmitted at this point is received first in step S133 by the searchee device 31 that is at a closer location in relation to the searcher device 21. In step S134, the searchee device 31 responds with respect to the search from the searcher device 21.

The response from the searchee device 31 is received by the searcher device 21 in step S116. In step S117, when two devices are detected, the searcher device 21 performs a process for when a device that is different from the device detected in the previous search is detected first.

Figure 8:
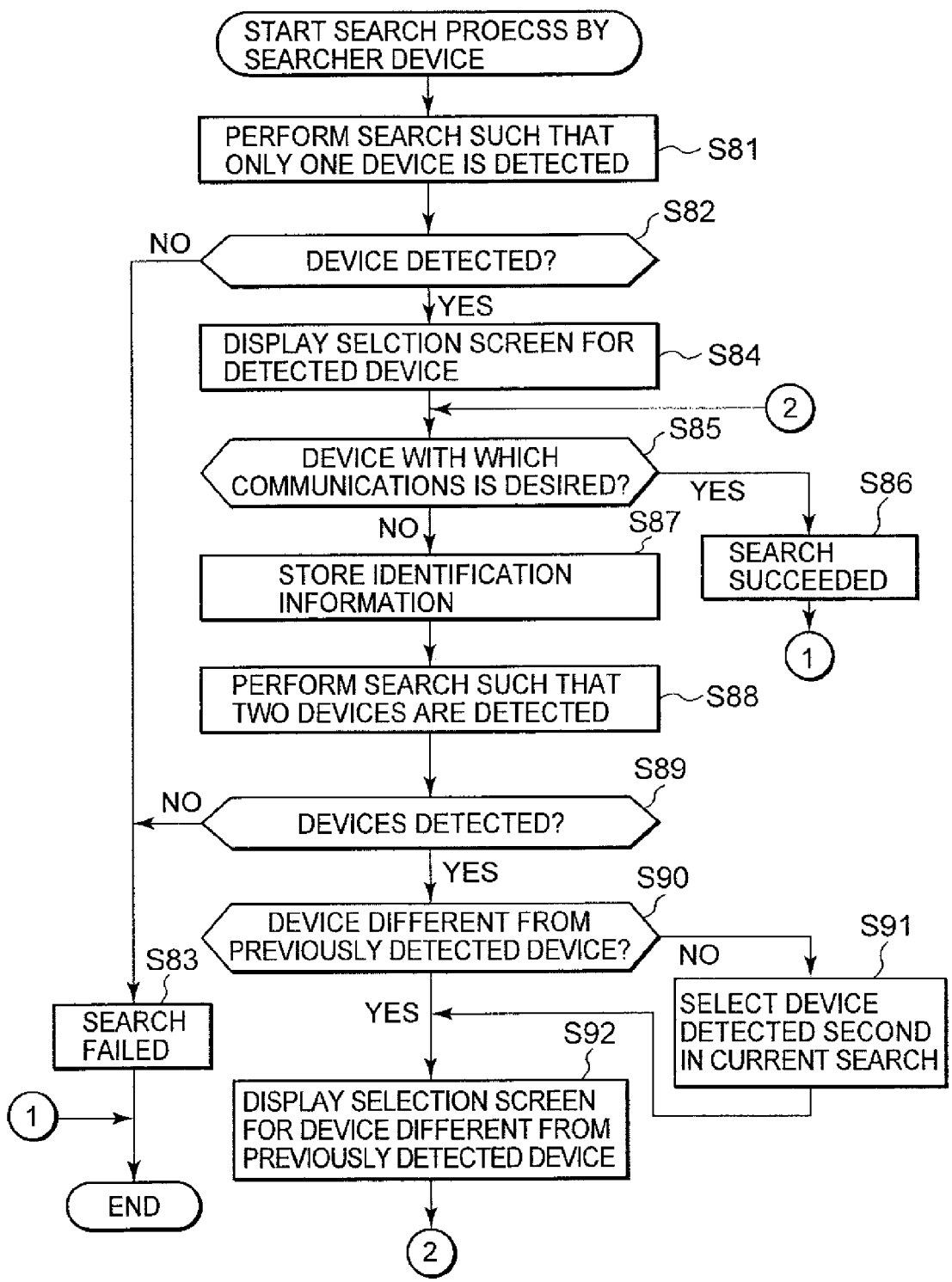
FIG. 8 is a flow chart illustrating the details of a process by the searcher device.

Specifically, when the process from step S89 and onward in FIG. 8 is executed, and the response from the searchee device 31 is received, the communications control section 61 determines that a device is detected, and proceeds to step S90. In step S90, the device selection section 65 determines that the searchee device 31 that is different from the searchee device 32 detected previously is detected, proceeds to step S91, and presents the searchee device 32 to the user without waiting for a response from the searchee device 32.

In addition, the inquiry packet transmitted in step S115 is received by the searchee device 32 in step S103, and a response with respect thereto is performed in step S104.

Thus, if a device that is different from the device detected in the previous search is detected first, by having the detected device presented without waiting for a response from other devices, it is possible to present a communications partner candidate device to the user more quickly.

In addition, filtering may be performed based on the intensity of the signal received at the searcher device 21, and the device to be presented on the selection screen may be selected from devices that transmit (emit) signals of an intensity of or above a predetermined threshold value.

In general, a user who performs short range wireless communications like Bluetooth communications instructs the initiation of communications after bringing his own device closer to the target device. Therefore, by excluding devices that do not transmit signals of an intensity of or above a predetermined threshold value, it is possible to present to the user at an earlier point devices that are more likely to be selected as a communications partner.

Figure 11:
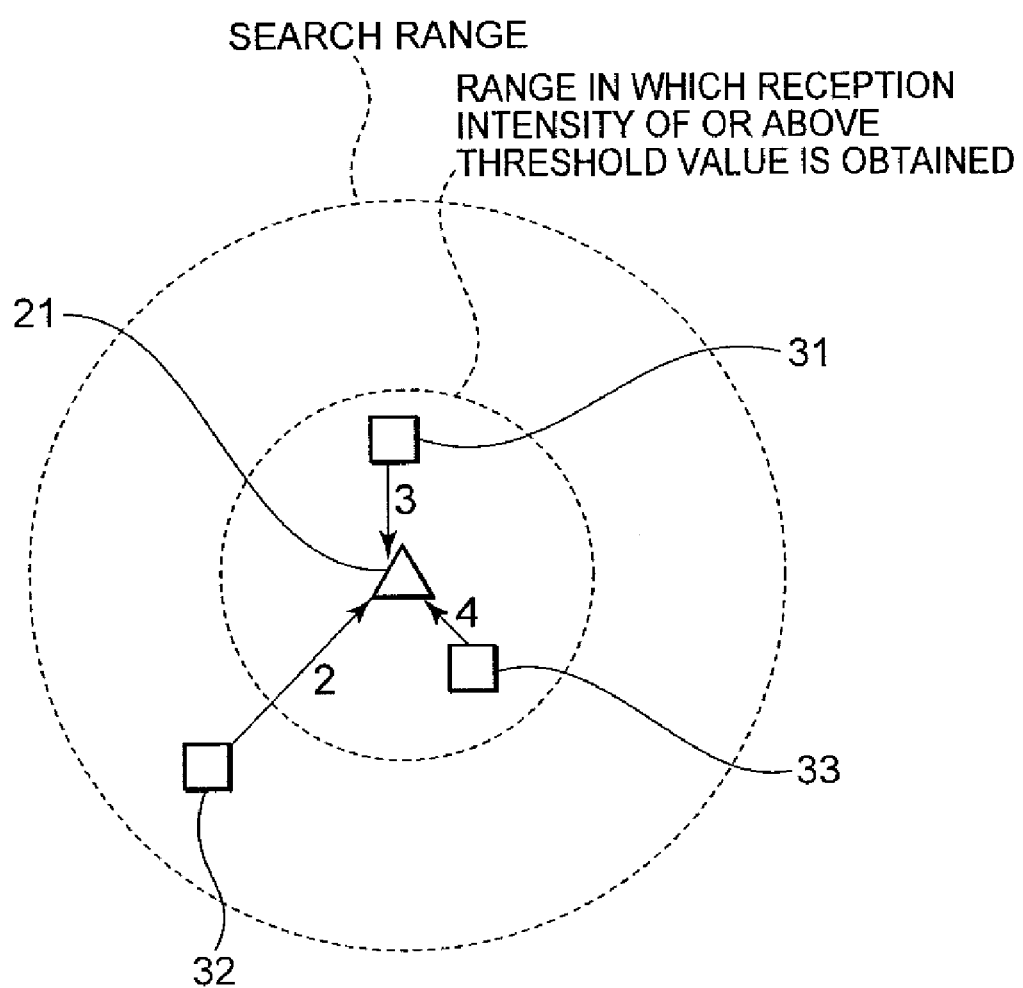
FIG. 11 is a diagram showing an arrangement example of each device.

FIG. 11 is a diagram showing another arrangement example of each device.

In FIG. 11, with the searcher device 21 as the center, the search range of the searcher device 21 is indicated with the circle in broken lines drawn on the outside. In addition, by the circle in broken lines shown on the inside thereof is indicated the range in which signals having an intensity of or above a predetermined threshold value is received by the searcher device 21. In other words, in the state in FIG. 11, the intensity of the signals transmitted from the searchee device 31 and a searchee device 33 are received by the searcher device 21 as being of or above the predetermined threshold value, and the intensity of the signals transmitted from the searchee device 32 is received by the searcher device 21 as being of or below the predetermined threshold value.

In addition, in FIG. 11, the numbers for the arrows in solid lines drawn from the searchee devices 31 through 33 towards the searchee device 31 represent the reception intensity of the signals transmitted from each device. Specifically, it is represented that the signals transmitted from the searchee device 31, the searchee device 32, and the searchee device 33 are received by the searcher device 21 as "level 3," "level 2," and "level 4," respectively.

When the searchee devices 31 through 33 are detected in a search, the searcher device 21 excludes from the devices to be presented to the user the searchee device 32 that does not transmit signals of an intensity of "level 3" or above that is set as the predetermined threshold value, and presents either the searchee device 31 or the searchee device 33.

Next, with reference to the flow chart in FIG. 12, processes performed by each device in FIG. 11 will be described.

Figure 12:
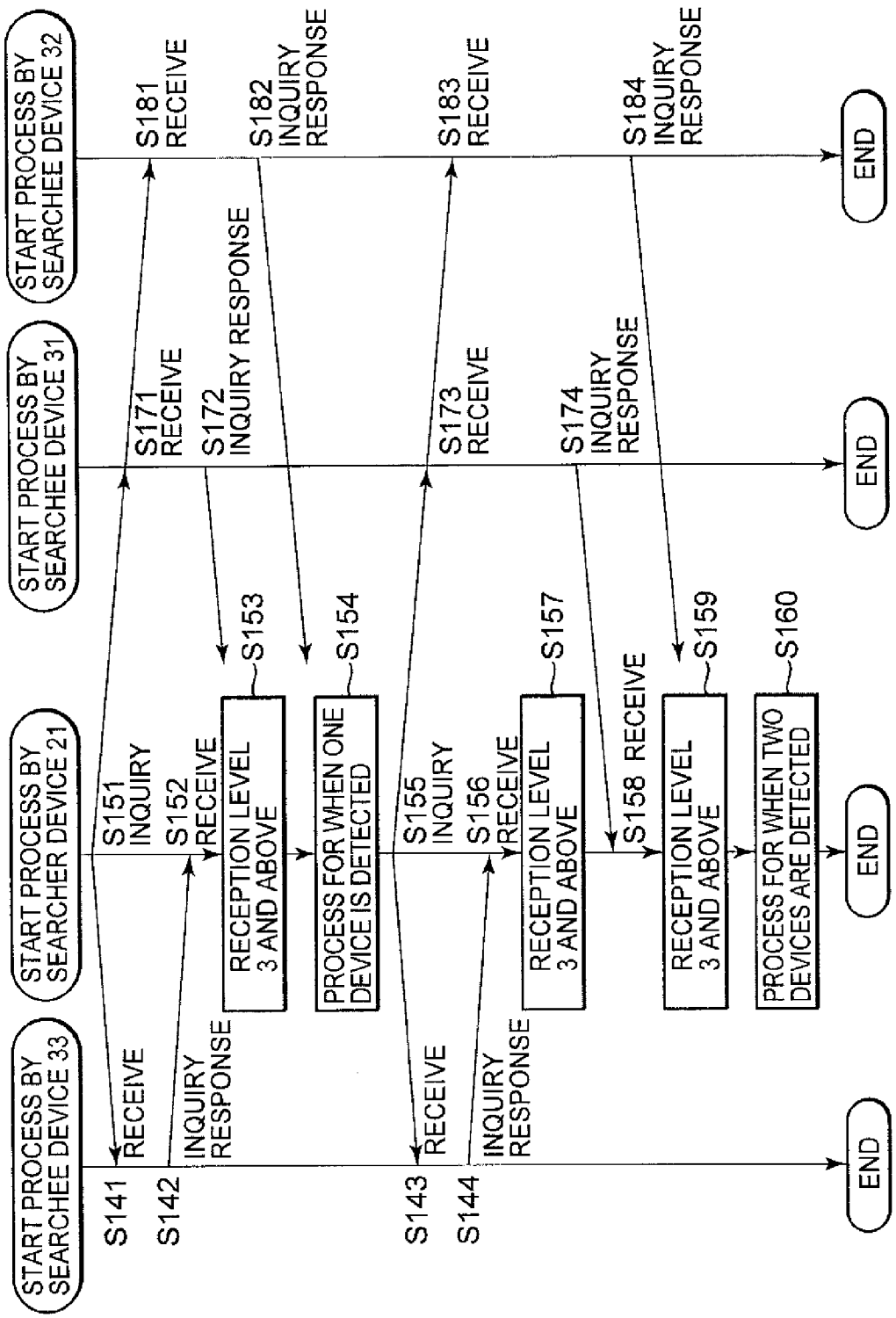
FIG. 12 is a flow chart illustrating processes performed by each of the devices in FIG. 11.

The processes in FIG. 12 are essentially similar to the processes described with reference to FIG. 6 except in that a process of detecting the intensity of the transmitted signals and a process of selecting the devices to be presented based on the detected intensity are added.

In other words, when a device search is instructed, the searcher device 21 broadcasts an inquiry packet in step S151. The device search performed at this point is performed so as to detect only one device.

The inquiry packet broadcast by the searcher device 21 is received in step S141 by the searchee device 33 that is at the closest location with respect to the searcher device 21. When the inquiry packet is received, the searchee device 33 proceeds to step S142, and transmits to the searcher device 21 a response message with respect to the inquiry packet.

The searcher device 21 receives in step S152 the response message transmitted from the searchee device 33, proceeds to step S153, detects the intensity of the signal used to transmit the response message, and identifies that it is "level 4" which is equal to or higher than the predetermined threshold value (for example, "level 3").

When a device that transmits a signal of an intensity of or above the threshold value is detected, the searcher device 21 proceeds to step S154, and performs a process for when one device is detected. Here, as in the process described with reference to FIG. 6 and the like, the selection screen in FIG. 13A that prompts a selection as to whether or not communications is to be performed with the detected searchee device 33 is displayed on the display section 47.

Figure 13A:
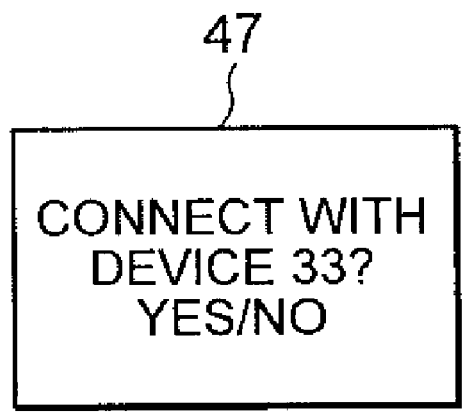
FIG. 13A is a diagram showing an example of a screen displayed on a display section.

For example, if communications with the searchee device 31 is desired, the user selects "No" with respect to the screen in FIG. 13A.

In addition, in step S172, a response is also performed by the searchee device 31 with respect to the search, but since a response is already acquired from the searchee device 33 and a process with respect thereto is being performed, a process with respect to the response from the searchee device 31 (a process of presenting the searchee device 31) is not performed at this point. In addition, in step S182, a response is also performed by the searchee device 32 with respect to the search, but since the signal used in the response from the searchee device 32 is received by the searcher device 21 as being of an intensity below the threshold value, a selection screen for selecting whether or not to connect with the searchee device 32 is not displayed.

Through the selection screen, if the searchee device 33 is not selected as a communications partner, proceeding to step S155, the searcher device 21 performs another search. At this point, a search is performed so as to detect two devices.

The inquiry packet broadcast in step S155 is received by the searchee device 33 in step S143, is received by the searchee device 31 in step S173, and is received by the searchee device 32 in step S183.

In step S144, the searchee device 32 transmits to the searcher device 21 a response message with respect to the search. In addition, in step S174, the searchee device 31 transmits to the searcher device 21 a response message with respect to the search. Further, in step S184, the searchee device 32 transmits to the searcher device 21 a response message with respect to the search.

The response message from the searchee device 33 is received in step S156, and proceeding to step S157, it is identified that the signal intensity thereof is equal to or above "level 3." In addition, the response message from the searchee device 31 is received in step S158, and proceeding to step S159, it is identified that the signal intensity thereof is "level 3" which is equal to or above "level 3."

Since the search performed in step S155 is so performed as to detect two devices, a process with respect to the response message transmitted from the searchee device 32 is not performed. Even if the response message from the searchee device 32 were received before those from the searchee device 31 and the like, since the signals transmitted from the searchee device 32 is of an intensity below the threshold value, a selection screen for selecting whether or not to connect with the searchee device 32 is not displayed. A process for such a case will be described later with reference to the flow chart in FIG. 15.

In step S160, the searcher device 21 performs a process for when two devices are detected. In other words, the searcher device 21 references the information managed by the detected device management section 63, and excludes, of the searchee device 31 and the searchee device 33 detected in the second search, the searchee device 33 that was not selected as a communications partner device in the previous search, and displays the selection screen in FIG. 13B for selecting whether or not to perform communications with the searchee device 31.

Figure 13B:
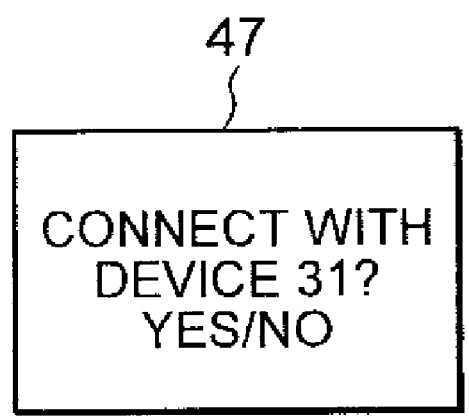
FIG. 13B is a diagram showing an example of a screen displayed on the display section.

If communications with the searchee device 31 is desired, the user selects "Yes" on the selection screen in FIG. 13B, and instructs that the searchee device 31 is to be made a communications partner.

Then, various processes, such as an authentication process and the like, are performed between the searcher device 21 and the searchee device 31, and Bluetooth communications is established.

Thus, since, from the devices detected through a search, devices for which a selection to not make them a communication partner is already made are excluded, along with which devices that are speculated to be at relatively distant positions due to the fact that their signal intensity is low are also excluded, devices that are likely to be selected as a communications partner can be presented to the user quickly.

Figure 14:
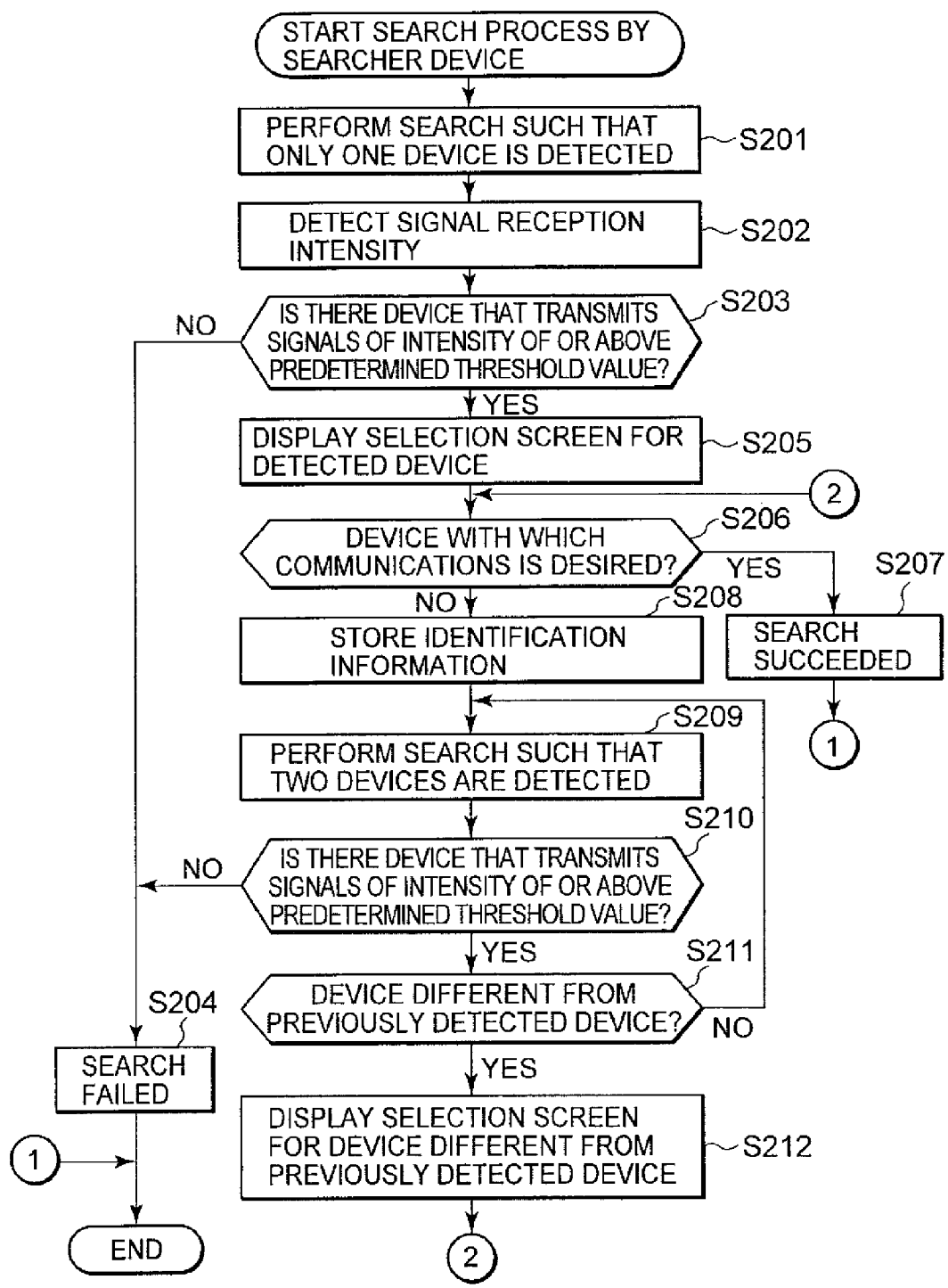
FIG. 14 is a flow chart illustrating the details of a process by the searcher device.

Next, with reference to the flow chart in FIG. 14, a process by the searcher device 21 in FIG. 12 will be described in detail. The process in FIG. 14 is a process similar to the process described with reference to the flow chart in FIG. 8 except in that the signal reception intensity is used in the selection of devices.

In other words, in step S201, the communications control section 61 so performs a search as to detect only one device. In step S202, the reception intensity detection section 64 detects the reception intensity of the signals, which are from devices that responded to the search, at the Bluetooth module 49. In addition, in step S203, the reception intensity detection section 64 determines whether or not there is a device that transmits signals of an intensity of or above a predetermined threshold value, and if it is determined that there is no such device, proceeds to step S204, deems the search a failure, and then terminates the process.

In addition, in step S203, if a transition to search failure is made immediately when it is determined that there is no device that transmits signals of an intensity of or above the predetermined threshold value, if a plurality of devices are detected, the process would be terminated even if, by chance, the transmission signal intensity of the detected devices just happened to be weak. Therefore, for example, if devices that transmit signals of an intensity of or above the predetermined threshold value are not detected, the number of devices subject to the search may be incremented by one, and another search performed. In addition, searches may be executed repeatedly until a device that transmits signals of an intensity of or above the predetermined threshold value and that is different from the device detected previously is detected or until new devices are not found any more.

On the other hand, in step S203, if the reception intensity detection section 64 determines that there is a device that transmits signals of an intensity of or above the threshold value, it proceeds to step S205. The process of steps S205 through S208 is a process similar to the process of steps S84 through S87 in FIG. 8. In other words, in step S205, the device selection section 65 displays on the display section 47 a selection screen for selecting whether or not to select the detected device as a communications partner. For example, if the searchee device 33 that is at the closest location is detected, the screen in FIG. 13A described above is displayed on the display section 47.

In step S206, with respect to the selection screen, if the presented device is selected as the device with which communications is desired, the device selection section 65 proceeds to step S207, deems the search a success, and then terminates the process. On the other hand, in step S206, if the device presented on the selection screen is selected as not being the device with which communications is desired, the device selection section 65 instructs the communications control section 61 to perform another search.

In addition, device information including identification information for the device that is selected as not being a communications partner device is saved by the detected device management section 63 in step S208.

In step S209, the communications control section 61 so performs a search as to detect two devices. The reception intensity detection section 64 detects the intensity of the signals used in the response with respect to the search performed in step S209, and determines in step S210 whether or not there is, in the detected devices, a device that transmits signals of an intensity of or above the predetermined threshold value.

If it is determined in step S210 that there is no device that transmits signals of an intensity of or above the threshold value, the reception intensity detection section 64 proceeds to step S204, deems the search a failure, and then terminates the process, while on the other hand, if it is determined that there is a device that transmits signals of an intensity of or above the threshold value, it proceeds to step S211. In addition, in this case, too, instead of making the transition to search failure and then terminating the process, the number of devices subject to a search may be incremented by one, and another search performed. In addition, searches may be executed repeatedly until a device that transmits signals of an intensity of or above the predetermined threshold value and that is different from the device detected previously is detected or until new devices are not found any more.

In step S211, the device selection section 65 references the information managed by the detected device management section 63, determines whether or not the device detected in the present search (the search performed in step S208) is a device different from the device found in the previous search (the search performed in step S201), returns to step S208 if it determines that it is the same device, and repeats execution of the process subsequent thereto.

On the other hand, if it is determined in step S211 that the device detected in the present search is a device that is different from the device detected in the previous search, the device selection section 65 proceeds to step S212, and displays a selection screen for selecting whether or not to perform communications with that device. For example, if the searchee device 31 which is a device different from the searchee device 33 that was selected as not being a communications partner and which is a device that transmits signals of an intensity of or above the threshold value is detected in the second search, the selection screen in FIG. 13B is displayed on the display section 47.

Then, the process from step S206 and onward is executed, and if in the selection screen in FIG. 13B a selection to make the searchee device 31 a communications partner is made, proceeding to step S207, the search is deemed a success, and the process is then terminated.

Next, with reference to the flow chart in FIG. 15, other processes performed by each device in FIG. 11 will be described.

Figure 15:
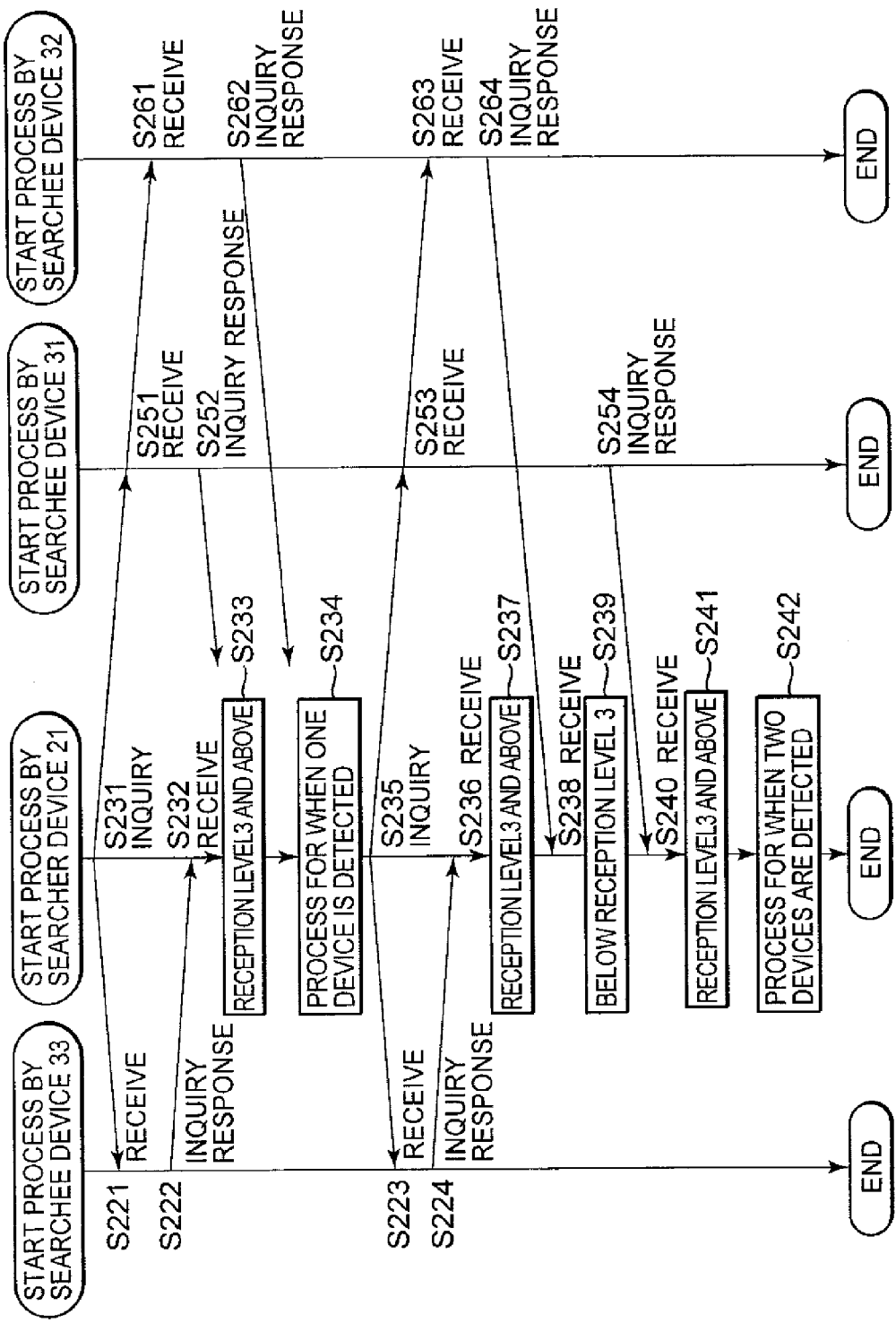
FIG. 15 is a flow chart illustrating other processes performed between each of the devices in FIG. 11.

The processes in FIG. 15 are processes similar to the processes in FIG. 12, and differ in that, with respect to the second search, a response is performed by the searchee device 33 before the searchee device 31. For example, depending on reflective objects in the surroundings of a device or on the characteristics of the Bluetooth module of a device, there are cases like this one in which a response to a search is performed first by the searchee device 33 which is at a remote location from the searcher device 21.

The process of steps S221 through S224 (the process by the searchee device 33), the process of steps S231 through S237 (the process by the searcher device 21), the process of steps S251 through S253 (the process by the searchee device 31) and the process of steps S261 through S263 (the process by the searchee device 32) in FIG. 15 are similar to the processes described with reference to FIG. 12.

In other words, the searchee device 33 that transmits to the searcher device 21 a response message first in the first search is presented to the user, and a selection to not perform communications with the searchee device 33 is made through that selection screen.

In step S264, the searchee device 32 responds with respect to the second search. In step S238, this response is received by the searcher device 21, and proceeding to step S239, it is determined that the reception intensity thereof is not of or above the threshold intensity ("level 3") (that it is below "level 3"). As shown in FIG. 11, the searchee device 32 exists outside of the range in which a reception intensity of or above the threshold value can be obtained.

Therefore, a selection screen for selecting whether or not to perform communications with the searchee device 32 is not displayed.

On the other hand, in step S254, the searchee device 31 responds with respect to the second search. In step S240, this response is received by the searcher device 21, and proceeding to step S241, it is determined that the reception intensity thereof is of or above the threshold intensity.

In step S242, the searcher device 21 performs a process for when two devices are detected. In other words, the searcher device 21 references the information managed by the detected device management section 63, and excludes, of the searchee devices 31 through 33 detected in the second search, the searchee device 33 that was not selected as a communications partner in the previous search and the searchee device 32 that does not transmit signals of an intensity of or above the threshold value, and displays the selection screen in FIG. 13B for selecting whether or not to perform communications with the searchee device 31.

In the description above, when a plurality of devices are detected in a search, the device that responds to the search first (excluding devices for which a selection to not make them a communications partner is already made and devices that do not transmit signals of or above a threshold value) is presented to the user, however, the device that transmits signals of the highest intensity may be presented to the user with priority instead.

In addition, in accordance with the type of device (categories such as personal computer, PDA and the like), devices that are presented with priority may be selected based on the priority level assigned to each device. Thus, the selection of the device to be presented may be performed based on various kinds of information.

In the description above, of the devices detected in a search, devices that were detected in the preceding search and not selected as a communications partner device, and devices that do not transmit signals of an intensity of or above a threshold value are excluded from the devices to be presented on a selection screen. However, such excluded devices may instead be registered on a revocation list, and all devices registered on that list may be excluded from the devices to be presented on the selection screen.

Figure 16:
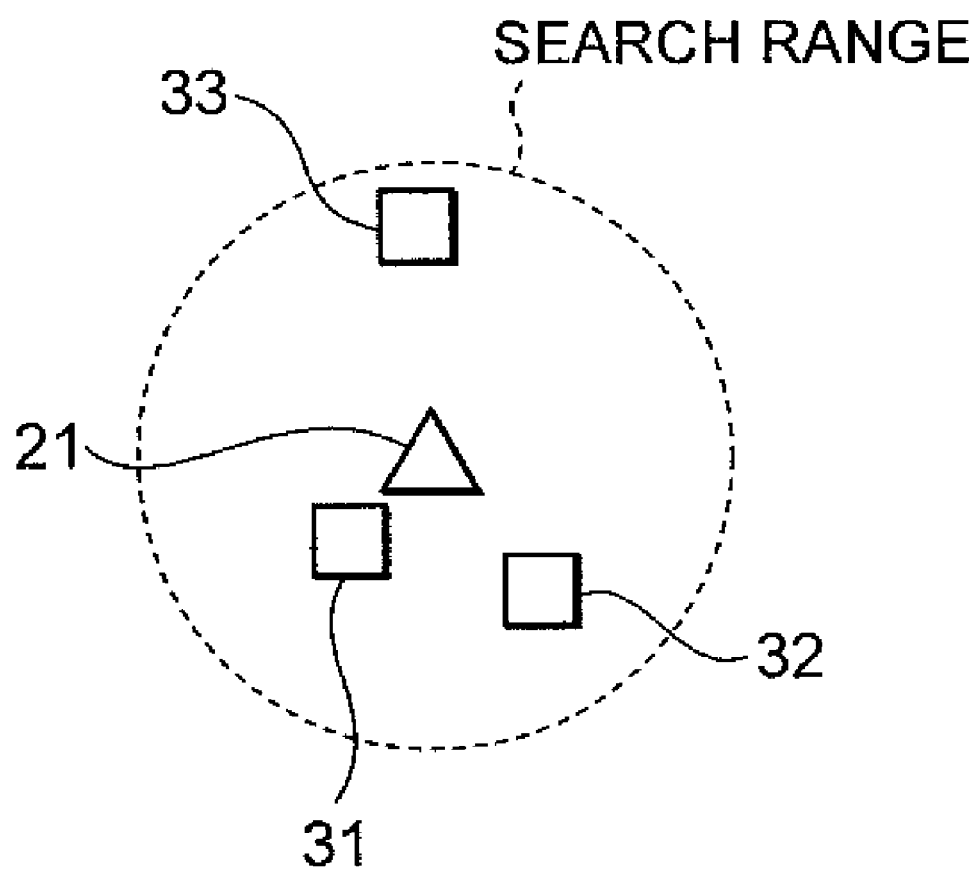
FIG. 16 is a diagram showing an arrangement example of each device.

FIG. 16 is a diagram showing an arrangement example of each device.

In the example in FIG. 16, of the searchee devices 31 through 33, with respect to the searcher device 21, the searchee device 31 is at the closest location, and the searchee device 32 is at the next closest location. In addition, the searchee device 33 is at the farthest location with respect to the searcher device 21.

In FIG. 16, a revocation list is managed by the searcher device 21. Therefore, devices that are registered on the revocation list in the sequence of the search process are excluded from the devices to be presented on the selection screen even if they are detected again in searches that are performed repeatedly.

Figure 17:
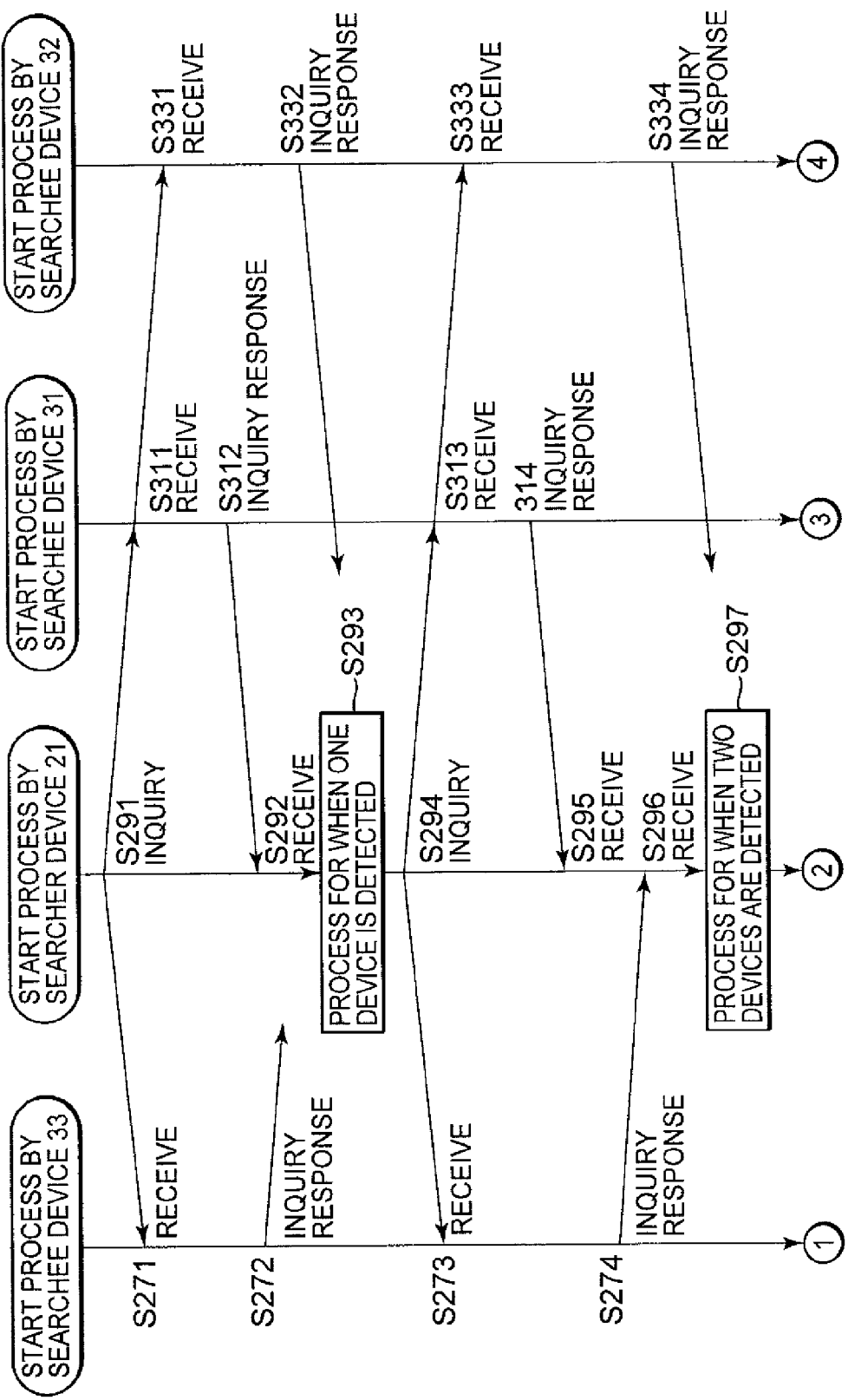
FIG. 17 is a flow chart illustrating processes performed by each of the devices in FIG. 16.
Figure 18:
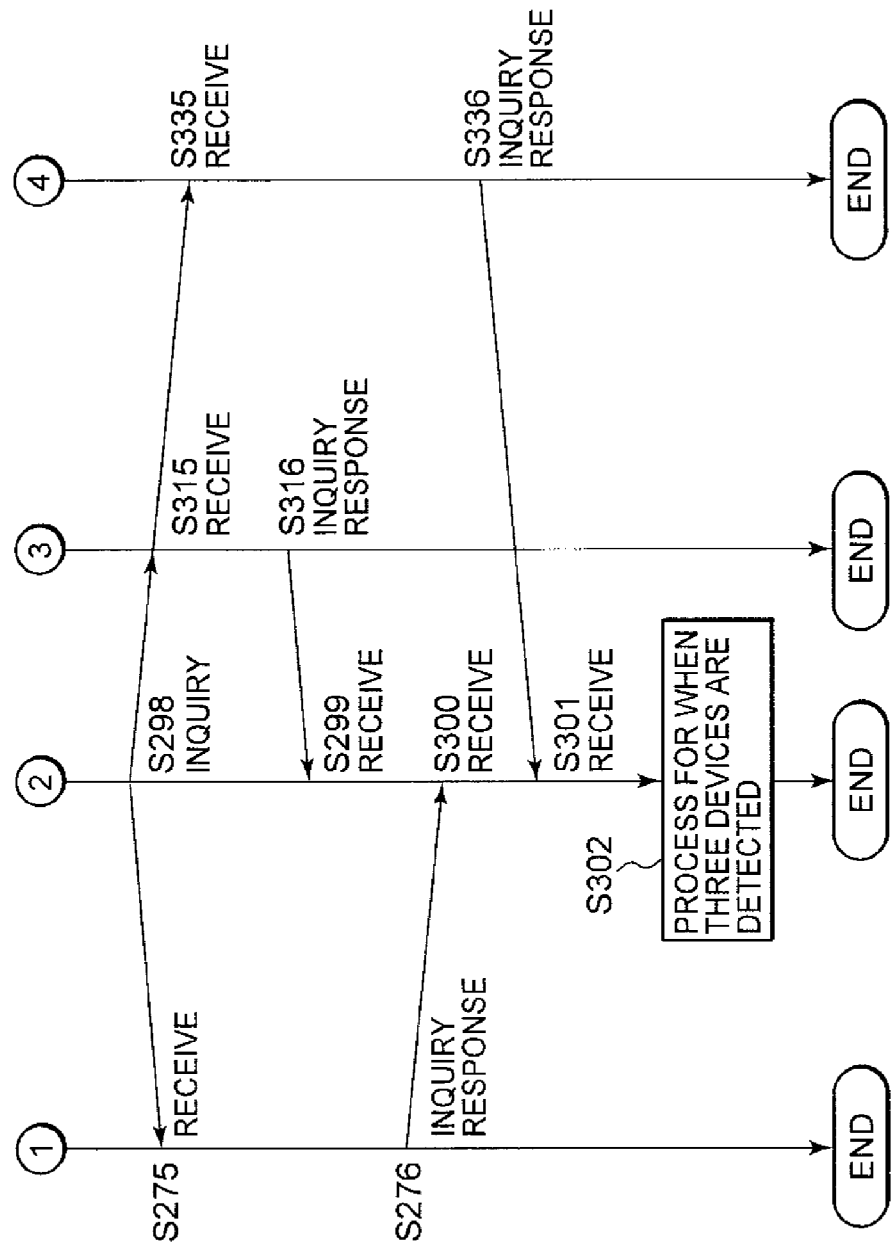
FIG. 18 is a flow chart continued from FIG. 17 and illustrates processes performed by each of the devices in FIG. 18.

Next, with reference to the flow charts in FIG. 17 and FIG. 18, processes performed by each device in FIG. 16 will be described.

In step S291, the searcher device 21 broadcasts an inquiry packet, and performs a search. The search performed at this point is so performed as to detect only one device.

The inquiry packet broadcast by the searcher device 21 is received in step S311 by the searchee device 31 that is at the closest location in relation to the searcher device 21, and a response with respect thereto is performed in step S312.

The response performed by the searchee device 31 is received by the searcher device 21 in step S292, and proceeding to step S293, a process for when one device is detected is performed. In other words, the selection screen in FIG. 19A for prompting a selection as to whether or not to make the searchee device 31 a communications partner is displayed on the display section 47.

In addition, if through the displayed selection screen the searchee device 31 is not selected as a communications partner, the searcher device 21 registers the device information of the searchee device 31 on the revocation list. For example, such information as the Bluetooth device name, the Bluetooth address and the like of the device that was not selected as a communications partner is registered on the revocation list.

FIG. 20A is a diagram showing an example of a revocation list.

For example, if the searchee device 31 is not selected as a communications partner, the Bluetooth device name "device 31" and the Bluetooth address "XXXXXX" of the searchee device 31 are registered on the revocation list as shown in FIG. 20A.

In addition, the inquiry packet transmitted in step S291 is received by the searchee device 32 in step S271, and a response with respect thereto is performed in step S272. Similarly, the inquiry packet transmitted in step S291 is received by the searchee device 33 in step S331, and a response with respect thereto is performed in step S332. A process is not performed at this point with respect to either of the responses.

In step S294, the searcher device 21 so performs a search as to detect two devices.

The inquiry packet broadcast by the searcher device 21 is received by the searchee device 31 in step S313, is received by the searchee device 32 in step S273, and is received by the searchee device 33 in step S333.

In step S314, the searchee device 31 transmits a response message to the searcher device 21. In addition, in step S274, the searchee device 32 transmits a response message to the searcher device 21.

The response message from the searchee device 31 and the response message from the searchee device 32 are received by the searcher device 21 in steps S295 and S296, respectively. In addition, a process with respect to the response from the searchee device 33 performed in step S334 is not performed at this point.

In step S297, the searcher device 21 performs a process for when two devices are detected. The searcher device 21 references the information on the revocation list managed by the list management section 62, and excludes, of the searchee device 31 and the searchee device 32 detected in the second search, the searchee device 31 that was not selected as a communications partner in the previous search, and displays the selection screen in FIG. 19B for selecting whether or not to perform communications with the searchee device 32.

Figure 19A:
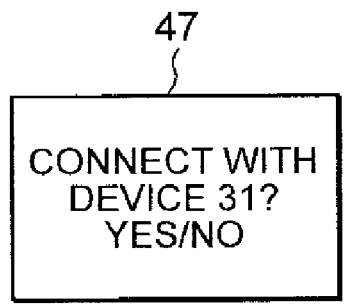
FIG. 19A is a diagram showing an example of a screen displayed on a display section.
Figure 19B:
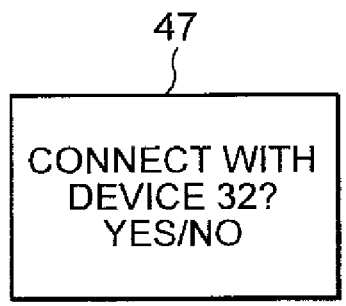
FIG. 19B is a diagram showing an example of a screen displayed on the display section.

For example, if communications with the searchee device 33 is desired, on the screen in FIG. 19B, the user instructs that the searchee device 32 is not to be made a communications partner. In accordance therewith, the searcher device 21 registers the device information of the searchee device 32 on the revocation list.

FIG. 20B is a diagram showing an example of a revocation list where the Bluetooth device name and the Bluetooth address of the searchee device 32 have been added to the revocation list in FIG. 20A.

In the example in FIG. 20B, the Bluetooth device name "device 32" and the Bluetooth address "YYYYYY" of the searchee device 32 are added to the revocation list in FIG. 20A.

Thus, even if the searchee device 31 and the searchee device 32 are detected again in subsequent searches, these devices will be excluded from the selection of devices to be presented to the user.

In step S298, the searcher device 21 further performs a search. The search performed at this point is so performed as to detect three devices, incrementing the previous number of search subjects (two) by one.

As in the searches performed up to this point, the searchee device 31 receives the search from the searcher device 21 in step S315, proceeds to step S316, and responds with respect thereto. In addition, the searchee device 32 receives the search from the searcher device 21 in step S275, proceeds to step S276, and responds with respect thereto. Further, the searchee device 33 receives the search from the searcher device 21 in step S335, proceeds to step S336, and responds with respect thereto.

The searcher device 21 receives the response from the searchee device 31, the response from the searchee device 32 and the response from the searchee device 33 in steps S299 through S301, respectively, proceeds to step S302, and performs a process for when three devices are detected. In other words, the searcher device 21 references the information on the revocation list, and excludes, of the searchee devices 31 through 33 detected in the third search (the search performed in step S298), the searchee device 32 that was not selected as a communications partner in the previous search (the search performed in step S294) and the searchee device 31 that was not selected as a communications partner in the search before that (the search performed in step S291), and displays the selection screen in FIG. 19C for selecting whether or not to perform communications with the searchee device 33.

Figure 19C:
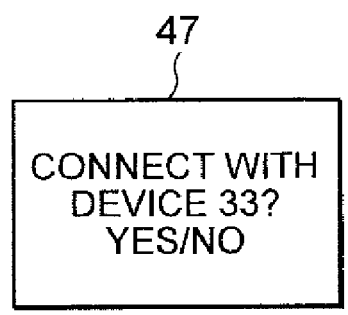
FIG. 19C is a diagram showing an example of a screen displayed on the display section.

For example, if communications with the searchee device 33 is desired, on the screen in FIG. 19C, the user instructs that the searchee device 33 is to be made a communications partner. Then, Bluetooth communications is established between the searcher device 21 and the searchee device 33.

Thus, since all devices for which a selection has already been made to not make them a communications partner are excluded from the devices detected through a search based on the information registered on the revocation list, devices that are likely to be selected as a communications partner device can be presented to the user.

In addition, the device information registered on the revocation list in the manner described above is initialized, for example, when the sequence of the search process (the sequence of processes from when the start of a search is instructed up to when a device is selected or up to when the termination of a search is instructed) is started or terminated.

Thus, even if a device is registered on the revocation list once, communications can be performed with that device in the next sequence of the search process without the user having to perform operations such as deleting the registered information.

Figure 21:
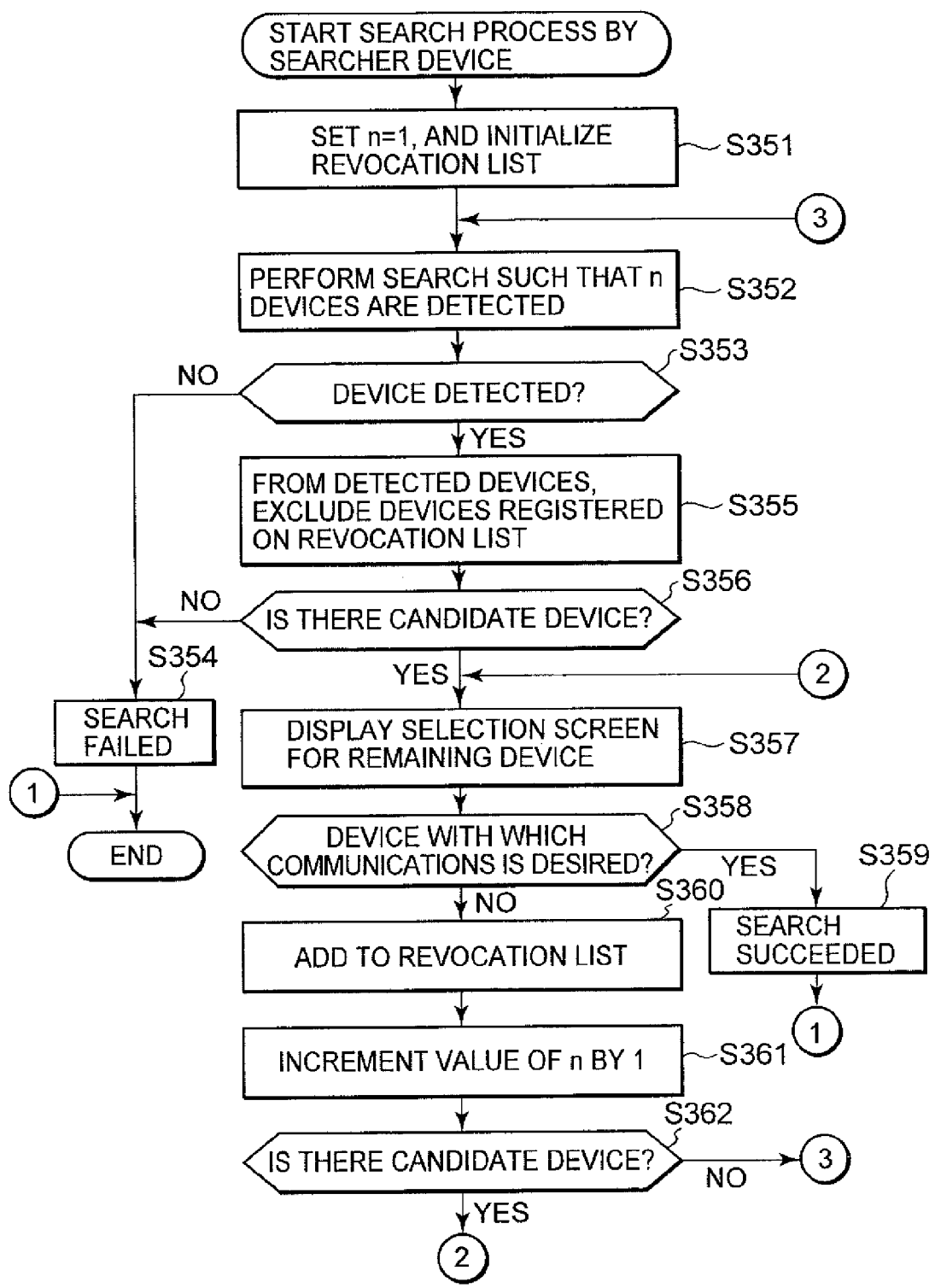
FIG. 21 is a flow chart illustrating the details of a process by the searcher device.

Next, with reference to the flow chart in FIG. 21, details of the process by the searcher device 21 in FIG. 17 and FIG. 18 will be described. The process in FIG. 21 is a process essentially similar to the process described with reference to FIG. 8 except in that a revocation list is managed.

In step S351, the device selection section 65 sets one for the value of variable n representing the number of devices that are subject to detection in a search, and initializes the revocation list managed by the list management section 62. The value of variable n set by the device selection section 65 is notified to the communications control section 61.

The value of variable n is incremented by one each time a search is performed.

In step S352, the communications control section 61 so performs a search as to detect n devices based on the value notified from the device selection section 65. For example, in the search performed immediately after the sequence of processes is started, a search is performed so as to detect only one device.

In step S353, the communications control section 61 determines whether or not a device is detected, proceeds to step S354 if it is determined that no device is detected since there is no response from any device, deems the search a failure, and then terminates the process.

On the other hand, the communications control section 61 proceeds to step S355 if it is determined in step S353 that a device is detected. In step S355, the device selection section 65 references the information on the revocation list managed by the list management section 62, and excludes devices registered on the list from the detected devices.

In step S355, the device selection section 65 determines whether or not there is, among the devices detected in the search, a candidate device to be selected as a communications partner. For example, if all of the detected devices are devices that are registered on the revocation list, it is determined in step S355 that there are no candidate devices, and proceeding to step S354, the registration is deemed a failure, and the process is then terminated.

On the other hand, in step S356, if it is determined that there is, among the detected devices, a device that is not registered on the revocation list, the device selection section 65 proceeds to step S357, and displays a selection screen for selecting whether or not to make the remaining device, that is, a device that is different from the devices registered on the revocation list, a communications partner.

For example, if the searchee device 31 in FIG. 16 is not registered on the revocation list, the screen in FIG. 19A described above is displayed on the display section 47.

In step S358, based on the output from the input detection section 67, the device selection section 65 determines whether or not the device presented in step S357 is selected as a device with which communications is desired. In step S358, for example, if it is determined that a selection to make the searchee device 31 a communications partner is made with respect to the screen in FIG. 19A, the device selection section 65 proceeds to step S359, deems the search a success, and then terminates the process.

On the other hand, if in step S358 it is determined that a selection to not make the device presented on the selection screen a communications partner is made, the device selection section 65 proceeds to step S360, controls the list management section 62, and makes it register on the revocation list the device information of the device for which a selection to not make it a communications partner is made.

For example, through the screen in FIG. 19A, if it is selected that the searchee device 31 is not to be a communications partner, the revocation list in FIG. 20A is created.

In step S361, the device selection section 65 increments variable n by one. Thus, compared to the immediately preceding search, the next search is performed with one more device as subjects.

In step S362, the device selection section 65 determines whether or not there is a device that might be a communications partner candidate which may potentially be selected as a communications partner.

In step S362, if it is determined that there is a communications partner candidate device, the device selection section 65 returns to step S357, and performs the process from that point and onward. If, for example, a plurality of devices not registered on the revocation list are detected simultaneously through a search, it is determined in step S362 that there are candidate devices.

On the other hand, in step S362, if it is determined that there is no candidate device, the device selection section 65 returns to step S352, and repeats execution of the process subsequent thereto.

Thus, by registering devices that are not selected as a communications partner device on a revocation list, and excluding all devices registered on the list from devices to be presented, it is possible to present to the user more quickly devices that are likely to be selected as a communications partner device.

Next, with reference to the flow chart in FIG. 22, a search process by the searcher device 21 will be described.

Figure 22:
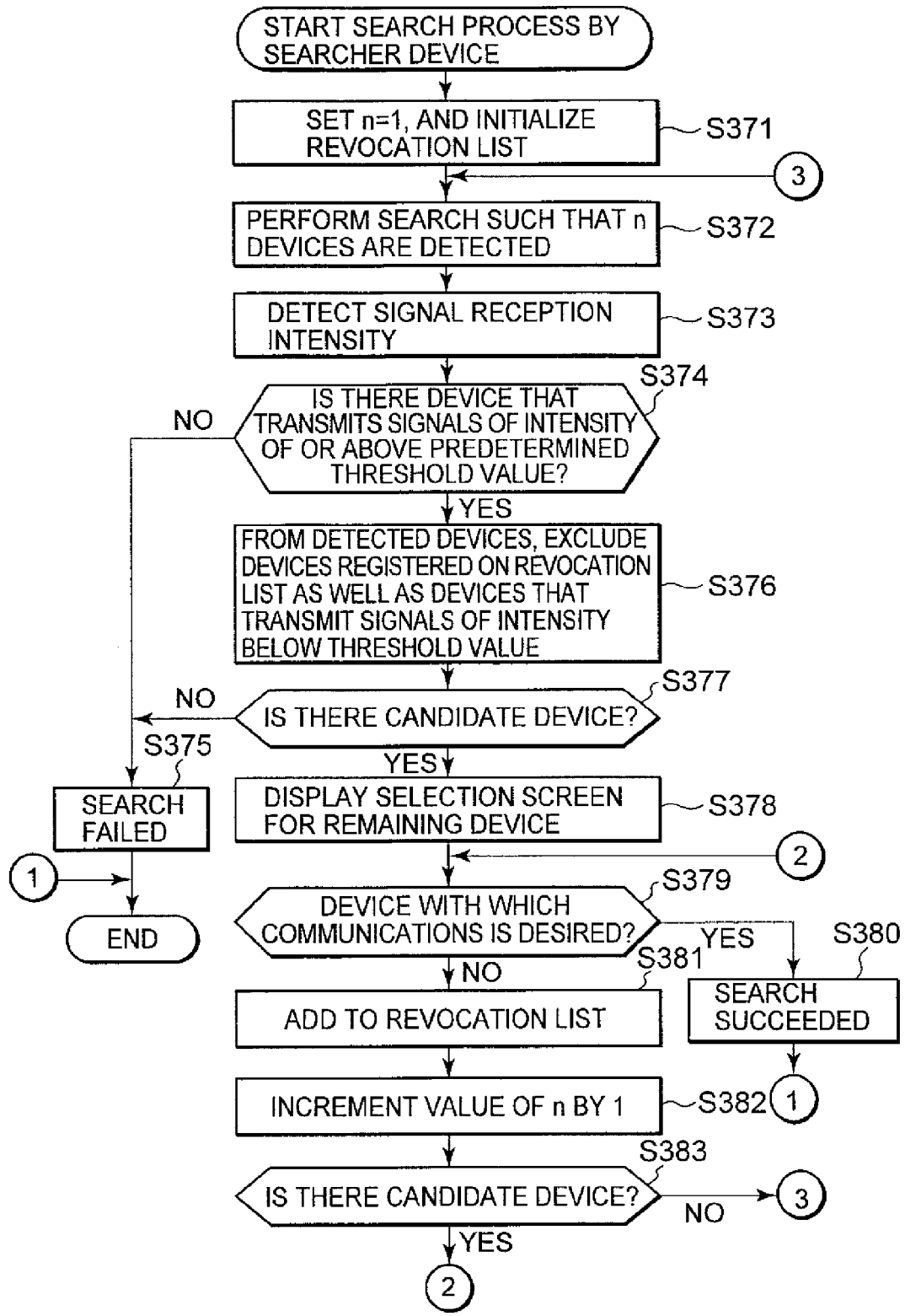
FIG. 22 is a flow chart illustrating another search process by the searcher device.

The process in FIG. 22 is one in which a process of excluding from devices to be presented devices that do not transmit signals of or above a predetermined threshold value (the process described with reference to FIG. 11) has been added to the process described with reference to FIG. 21.

In other words, the process of steps S371 and S372 is similar to the process of steps S351 and S352 in FIG. 21, and the reception intensity detection section 64 detects in step S373 the reception intensity for signals transmitted from a device detected in a search. In addition, in step S374, the reception intensity detection section 64 determines whether or not there is a device that transmits signals of an intensity of or above a predetermined threshold value, proceeds to step S375 if it determines that there is no such device, deems the search a failure, and then terminates the process. In addition, in this case, too, instead of making a transition to search failure and then terminating the process, the number of devices subject to a search may be incremented by one, and another search performed. In addition, searches may be executed repeatedly until a device that transmits signals of an intensity of or above the predetermined threshold value and that is different from the device detected previously is detected or until new devices are not found any more.

On the other hand, if in step S374 it is determined that there is a device that transmits signals of an intensity of or above the predetermined threshold value, the reception intensity detection section 64 proceeds to step S376.

In step S376, the device selection section 65 excludes from the devices detected in a search devices that are registered on the revocation list as well as devices that do not transmit signals of an intensity of or above the threshold value. Thus, devices that have already been selected as not being communications partner devices as well as devices that are at relatively remote locations from the searcher device 21 are excluded from devices to be presented to the user, and the remaining devices, that is, devices that are likely to be selected as a communications partner device, can be presented to the user.

The subsequent process of steps S377 through S383 are similar to the process of steps S356 through S362 in FIG. 21, and a description thereof will therefore be omitted.

Next, with reference to the flow charts in FIG. 23 and FIG. 24, another search process by the searcher device 21 will be described.

Figure 23:
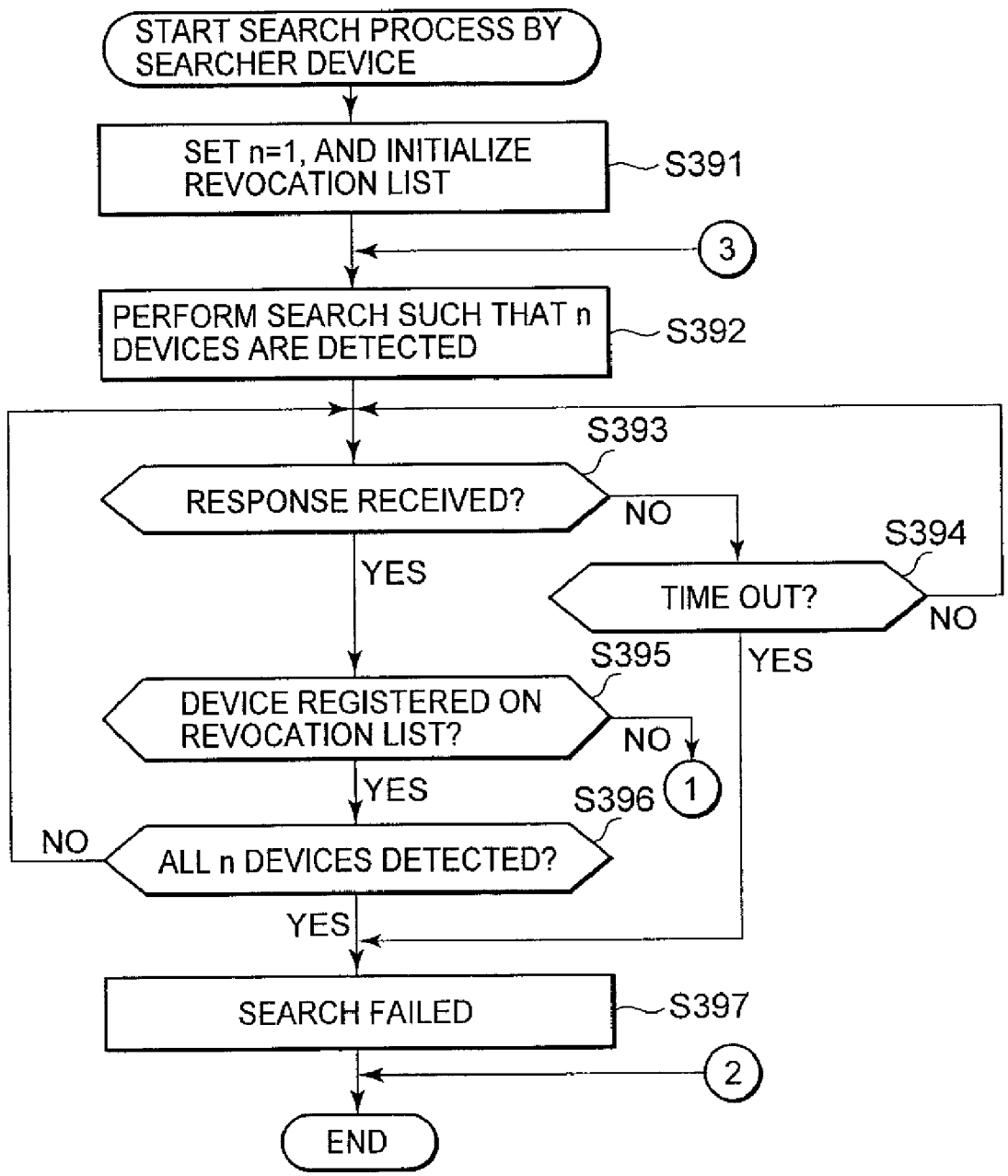
FIG. 23 is a flow chart illustrating yet another search process by the searcher device.
Figure 24:
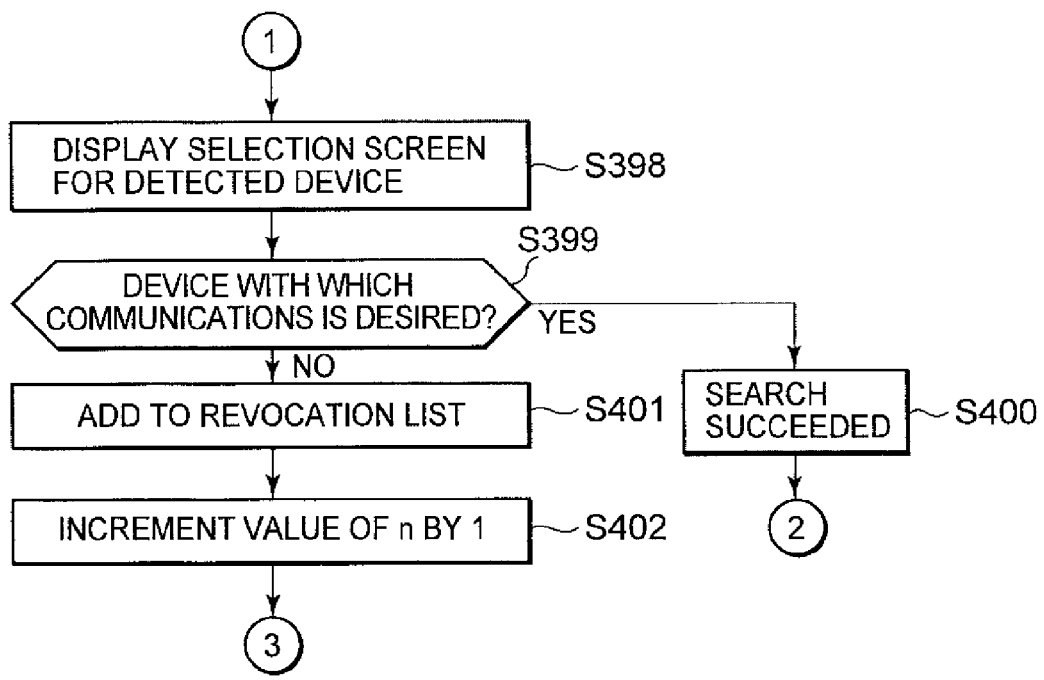
FIG. 24 is a flow chart continued from FIG. 23 and illustrates yet another search process by the searcher process.

In the process in FIG. 23 and FIG. 24, each time one device is detected in a search, it is determined whether or not that device is a device that is registered on the revocation list, and as for a device that is not registered, a selection screen for selecting whether or not to select it as a communications partner is presented to the user each time.

In the process described with reference to FIG. 21 and FIG. 22, even if the device the user wishes to make a communications partner is detected first, the subsequent process is not performed until n devices are detected, and is put on hold. However, as compared to this case, by making it possible to present each detected device, the search process can be finished more quickly.

The process in FIG. 23 and FIG. 24 is essentially similar to the process in FIG. 21. In step S391, the device selection section 65 sets the value of variable n to one, and initializes the revocation list. Based on the value set by the device selection section 65, a search is started in step S392 so as to detect n devices.

In step S393, the communications control section 61 determines whether or not a response from a device (a response with respect to the search) is received, proceeds to step S394 if it is determined that it is not received, and determines whether or not it is timeout, that is, whether or not a predetermined time has elapsed since the search started.

If in step S394 it is determined that it is timeout, the communications control section 61 proceeds to step S397, deems the search a failure, and then terminates the process, while on the other hand it returns to step S393 if it is determined that it is not timeout, and repeats execution of the process subsequent thereto.

If in step S393 it is determined that a response is received, the communications control section 61 proceeds to step S395. In step S395, the device selection section 65 references the information on the revocation list managed by the list management section 62, and determines whether or not the detected device is a device that is registered on the revocation list.

If it is determined in step S395 that the detected device is a device that is registered on the revocation list, the device selection section 65 proceeds to step S396, and determines whether or not all n devices have been detected. If it is determined in step S396 that n devices have not all been detected, the device selection section 65 returns to step S393, repeats execution of the process subsequent thereto, while on the other hand, if it is determined that all n devices have been detected, it proceeds to step S397, deems the search a failure and terminates the process.

If it is determined in step S395 that the detected device is a device that is not registered on the revocation list, the device selection section 65 proceeds to step S398, and displays a selection screen for that device. For example, the searchee device 31 in FIG. 16 is detected, and the searchee device 31 is found to be a device that is not registered on the revocation list, immediately after which the screen in FIG. 19A described above is displayed on the display section 47.

For example, if performing communications with the searchee device 31 is desired, on the screen in FIG. 19A the user selects the searchee device 31 as a communications partner. Therefore, as compared to a case in which it is waited until n devices are found and devices to be presented are selected from among the detected devices, it is possible to finish the search process more quickly.

The process in steps S399 through S402 is a process similar to the process in steps S357 through S360 in FIG. 21. In other words, in step S399, it is determined whether or not the presented device is selected as a device with which communications is desired, and if it is determined that it is selected as a device with which communications is desired, proceeding to step S400, the search is deemed a success and the process then terminated.

On the other hand, if it is determined in step S399 that the device presented on the selection screen is not selected as a device with which communications is desired, information on that device is added to the revocation list in step S401. Then, in step S402, the value of variable n is incremented by one and execution of the process from step S392 and onwards is repeated.

Next, with reference to the flow charts in FIG. 25 and FIG. 26, yet another search process by the searcher device 21 will be described.

Figure 25:
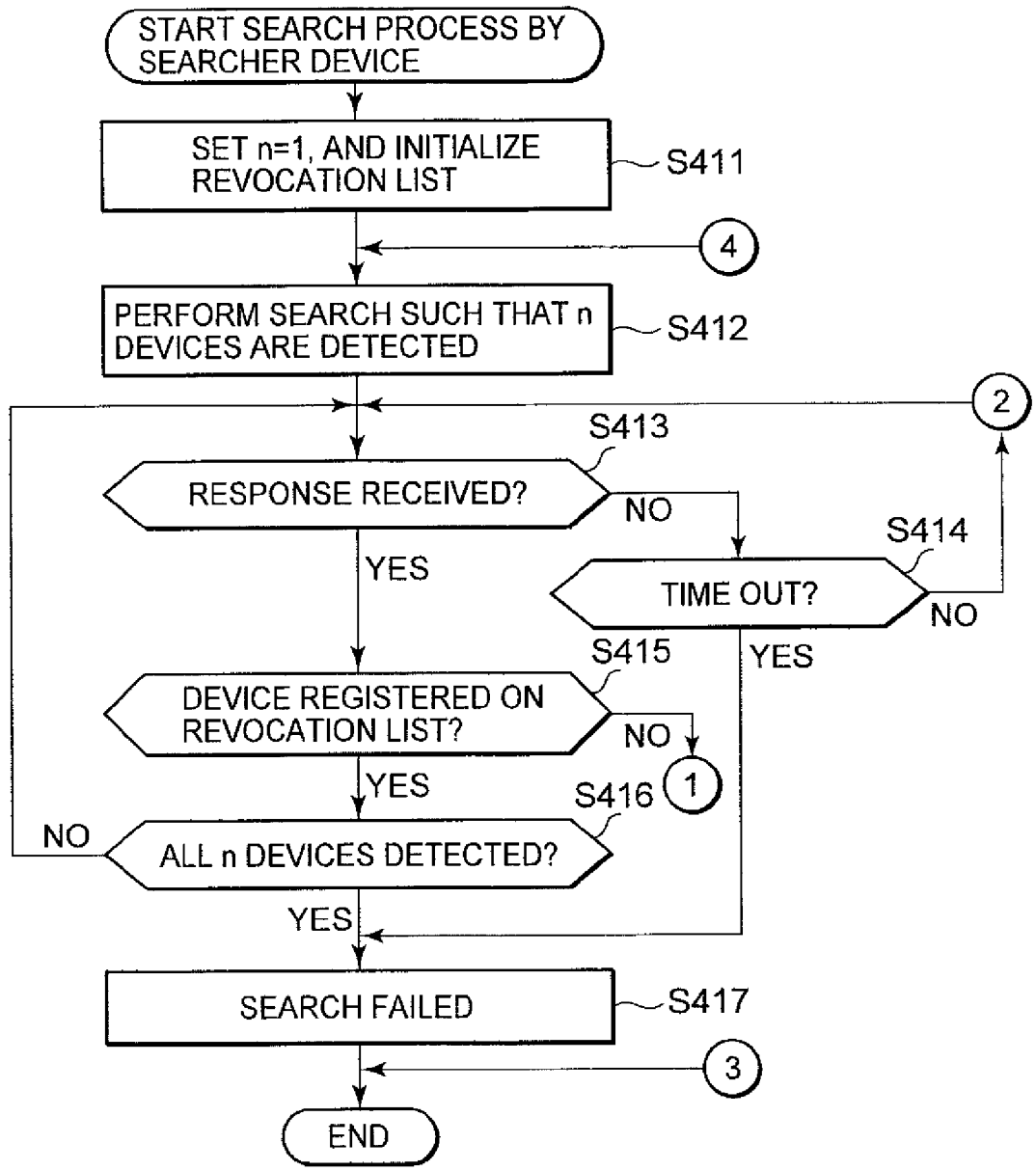
FIG. 25 is a flow chart illustrating a search process by the searcher device.
Figure 26:
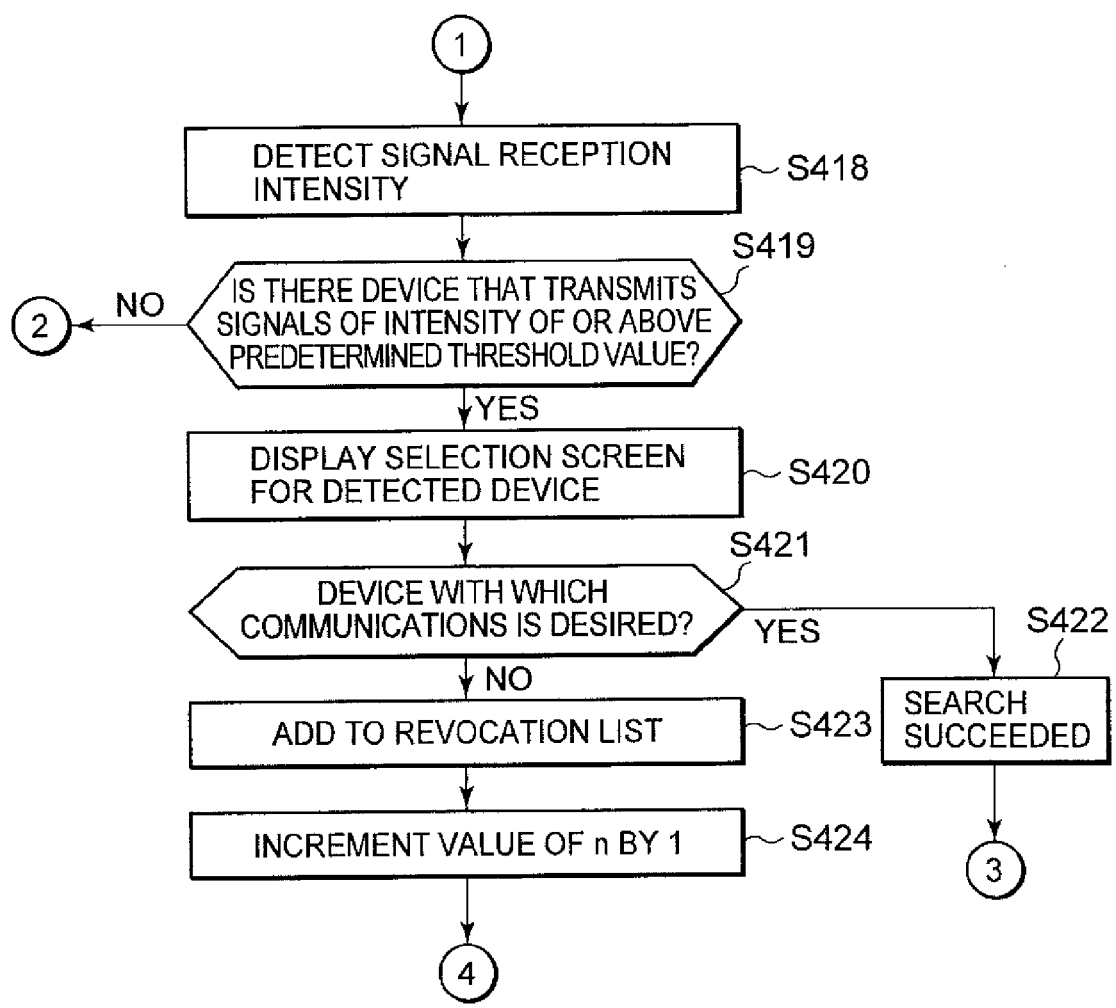
FIG. 26 is a flow chart continued from FIG. 25 and illustrates a search process by the searcher device.

The process in FIG. 25 and FIG. 26 is one in which the process described with reference to FIG. 11 and the like, where devices that do not transmit signals of or above a threshold value are excluded from devices to be presented, is added to the process described with reference to FIG. 23 and FIG. 24.

In other words, the process in steps S411 through S417 is similar to the process in steps S391 through S397 in FIG. 23, and the reception intensity detection section 64 detects in step S418 the reception intensity for signals transmitted from the devices detected in a search. In addition, in step S419, the reception intensity detection section 64 determines whether or not there is a device that transmits signals of an intensity of or above a predetermined threshold value, and if it is determined that there is no such device, returns to step S413 and repeats execution of the process subsequent thereto. In addition, if there are no devices that transmit signals of an intensity of or above the threshold value, instead of having the process subsequent to step S413 performed, the number of devices subject to a search may be incremented by one, and a search performed again. In addition, searches may be executed repeatedly until a device that transmits signals of an intensity of or above the predetermined threshold value and that is different from the device detected previously is detected or until new devices are not found any more.

On the other hand, if in step S419 it is determined that there is a device that transmits signals of an intensity of or above the threshold value, the reception intensity detection section 64 proceeds to step S420.

The process in steps S420 through S424 is similar to the process in steps S398 through S402 in FIG. 24. In other words, in step S420, a selection screen for a device that is not registered on the revocation list and that transmits signals of an intensity of or above the threshold value is displayed. If it is determined in step S421 that the device presented by the selection screen is selected as a communications partner, proceeding to step S422, the search is deemed a success, and the process is then terminated.

On the other hand, if it is determined in step S421 that the device presented on the selection screen is not selected as a device with which communications is desired, device information is added to the revocation list in step S423, and after the value of variable n is incremented by one in step S424, execution of the process from step S412 is repeated Through such a process, all devices that have already been selected as not being a communications partner device as well as devices that are at a relatively remote location from the searcher device 21 are excluded from devices to be presented to the user, and the remaining devices, that is, devices that are likely to be selected as a communications partner device, can be presented to the user.

Figure 27:
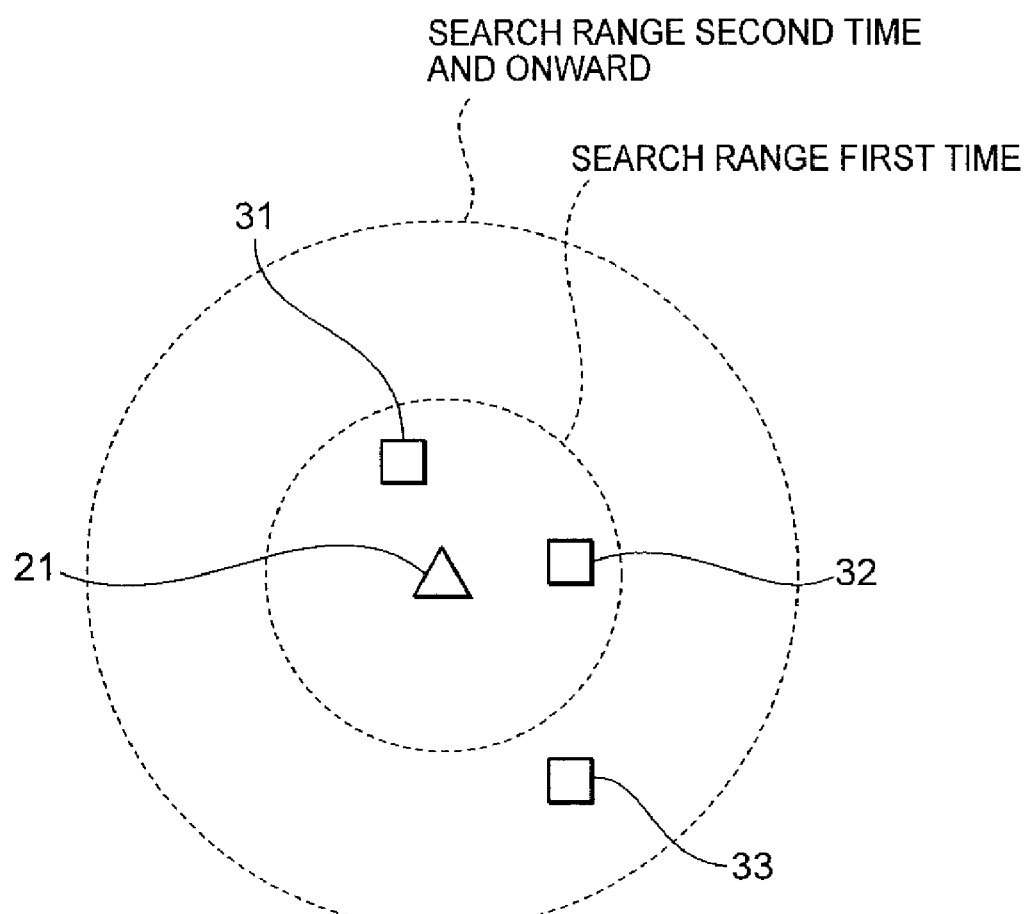
FIG. 27 is a diagram showing the switching of search ranges.

In the description above, when a plurality of searches is performed in the sequence of the search process, the search range of each is assumed to be always the same. However, as shown in FIG. 27 for example, the first search range may be performed within a range of a radius of a few ten centimeters in relation to the position of the searcher device 21, and the second and subsequent searches may be performed with a wider range.

In this case, the search section 61A controls the output of the Bluetooth module 49 and switches the search range in accordance with the number of searches performed.

Thus, in the first search, the search range can be limited and the number of devices detected as candidates reduced. As described above, in short range wireless communications such as Bluetooth communications, it is often the case that the user places his own device in close proximity to the device that is the connection target when starting communications. Therefore, by limiting the search range in the manner above, it is possible to detect only the devices that are likely to be selected as a communications partner.

In addition, the second search may also be performed while the device detected in the first search is being presented to the user and a selection as to whether or not to make that device a communications partner is being considered. As a result, the time taken for a search can be shortened.

In the description above, a description was given with respect to searches in Bluetooth communications, however, the present invention is applicable to various kinds of wireless communications besides Bluetooth communications. For example, the present invention may be applied to a wireless LAN (Local Area Network) such as IEEE (Institute of Electrical and Electronics Engineers) 802.11a, 802.11b and the like, or to infra-red communications and the like.

The series of processes described above may be executed by hardware, but it may also be executed by software.

If the series of processes is to be executed through software, programs constituting that software are installed, via a network or a storage medium, to a computer incorporated into dedicated hardware or to, for example, a general purpose personal computer that is capable of performing various functions by having various programs installed, and the like.

This storage medium may include not only packaged media, which include, as shown in FIG. 4, the magnetic disk 51 (including flexible disks), the optical disc 52 (including CD-ROM (Compact Disk-Read Only Memory) and DVD (Digital Versatile Disk)), the magneto-optical disc 53 (including MD (registered trademark) (Mini-Disk)) or the semiconductor memory 54 and the like on which programs are recorded, that are distributed separately from the apparatus itself in order to provide programs to the user, but may also include the ROM 42 in which programs are recorded, a hard disk included in the memory section 48 and the like, which are provided to the user in a state where they are pre-incorporated into the apparatus itself.

In addition, in the present description, the steps that describe the programs recorded on the storage medium naturally include processes performed chronologically in accordance with the order in which they are described, but they also include processes that are executed in parallel or individually, and not necessarily processed chronologically.

INDUSTRIAL APPLICABILITY

According to the present invention, communications can be performed with a device detected through a search.

In addition, according to the present invention, that search can be performed efficiently.

Further, according to the present invention, the user can efficiently and quickly select a device to be made a communications partner.

The invention claimed is:

1. A communications apparatus characterized by comprising:
   search means for performing a first search, through wireless communications, for devices existing within a range reachable by signals and detecting at least a first device;
   display control means for displaying a first selection screen including an identification of only the first device detected by the first search to a user, the first selection screen enabling the user to indicate whether or not the first device is a communications partner desired by the user;
   input means for receiving an input from the user through the first selection screen, the input indicating that the first device is not the desired communications partner; and
   memory means for storing, in response to the input, the identification of the first device in a list of communications partners not desired by the user,
   wherein, in response to the input:
      the search means performs a second search, through wireless communications, for devices existing within the range reachable by signals and detects at least the first device and a second device;
      the display control means displays a second selection screen including an identification of only the second device detected by the second search to the user, the second selection screen enabling the user to indicate whether or not the second device is the desired communications partner, the second selection screen excluding the identification of the first device detected by the second search based on the storage of the identification of the first device in the list of communication partners not desired the user.

2. The communications apparatus as described in claim 1, further comprising:
   communications control means for performing subsequent wireless communications with the first device or the second device as the communications partner when the first device is selected as a communications partner through the first selection screen or when the second device is selected as a communications partner through the second selection screen.

3. The communications apparatus as described in claim 1, wherein when a plurality of devices are simultaneously detected through the search performed by the search means, the display control means displays the first or the second selection screen with one of the plurality of devices as the first or the second device.

4. The communications apparatus as described in claim 1, wherein when a plurality of devices are simultaneously detected through the search performed by the search means, the display control means displays the first or the second selection screen with the device detected first of the plurality of devices as the first or the second device.

5. The communications apparatus as described in claim 1, further comprising:
   detection means for detecting reception intensity, at the communications apparatus, of signals transmitted from the devices detected through the search;
   wherein, based on the detection result by the detection means, the display control means displays the first or the second selection screen with a device that transmits signals of an intensity of or above a predetermined threshold value as the first or the second device.

6. The communications apparatus as described In claim 5, wherein when a plurality of devices are simultaneously detected through the search performed by the search means, based on the detection result by the detection means, the display control means displays the first or the second selection screen with the device that transmits the signal of the highest intensity of the plurality of devices as the first or the second device.

7. The communications apparatus as described in claim 1, wherein the memory means stores identification information of all the devices that were not selected as a communications partner.

8. The communications apparatus as described in claim 1, wherein the search means controls the search range such that the search range for the second search and onward is wider than the search range for the first search.

9. A communications method comprising:
performing a first search, through wireless communications, for devices existing within a range reachable by signals and detecting at least a first device;
displaying a first selection screen including an identification of only the first device detected by the first search to a user, the first selection screen enabling the user to indicate whether or not the first device is a communications partner desired by the user;
receiving an input from the user through the first selection screen, the input indicating that the first device is not the desired communications partner;
storing, in response to the input, the identification of the first device in a list of communications partners not desired by the user;
performing, in response to the input, a second search, through wireless communications, for devices existing within the range reachable by signals and detecting at least the first device and a second device; and
displaying a second selection screen including an identification of only the second device detected by the second search to the user, the second selection screen enabling the user to indicate whether or not the second device is the desired communications partner, the second selection screen excluding the identification of the first device detected by the second search based on the storage of the identification of the first device in the list of communications partners not desired by the user.

10. A storage medium for storing a computer readable program, which, when executed by a processor, performs a method comprising:
performing a first search, through wireless communications, for devices existing within a range reachable by signals and detecting at least a first device;
displaying a first selection screen including an identification of the first device detected by the first search to a user, the first selection screen enabling the user to indicate whether or not the first device is a communications partner desired by the user;
receiving an input from the user through the first selection screen, the input indicating that the first device is not the desired communications partner;
storing, in response to the input, the identification of the first device in a list of communications partners not desired by the user;
performing, in response to the input, a second search, through wireless communications, for devices existing within the range reachable by signals and detecting at least the first device and a second device; and
displaying a second selection screen including an identification the second device detected by the second search to the user, the second selection screen enabling the user to indicate whether or not the second device is the desired communications partner, the second selection screen excluding the identification of the first device detected by the second search based on the storage of the identification of the first device in the list of communications partners not desired by the user.

11. The communications method of claim 9, further comprising:
performing subsequent wireless communications with the first device or the second device as the communications partner when the first device is selected as the communications partner through the first selection screen or when the second device is selected as the communications partner through the second selection screen.

12. The communications method of claim 9, further comprising:
displaying the first or the second selection screen with one of the plurality of devices as the first or the second device when a plurality of devices are simultaneously detected through the searching.

13. The communications method of claim 9, further comprising:
detecting reception intensity of signals transmitted from the devices detected through the searching; and
displaying based on the detected reception intensity, the first or the second selection screen with a device that transmits signals of an intensity of or above a predetermined threshold value as the first or the second device.

14. The communications method of claim 9, further comprising:
storing identification information of all the devices that were not selected as the communications partner.

15. The communications method of claim 9, wherein a search range for the second search and onward is wider than a search range for the first search.

16. The storage medium of claim 10, wherein the method further comprises:
performing subsequent wireless communications with the first device or the second device as the communications partner when the first device is selected as the communications partner through the first selection screen or when the second device is selected as the communications partner through the second selection screen.

17. The storage medium of claim 10, wherein the method further comprises:
displaying the first or the second selection screen with one of the plurality of devices as the first or the second device when a plurality of devices are simultaneously detected through the searching.

18. The storage medium of claim 10, wherein the method further comprises:
detecting reception intensity of signals transmitted from the devices detected through the searching; and
displaying, based on the detected reception intensity, the first or the second selection screen with a device that transmits signals of an intensity of or above a predetermined threshold value as the first or the second device.

19. The storage medium of claim 10, wherein the method further comprises:
storing identification information of all the devices that were not selected as the communications partner.

20. The storage medium of claim 10, wherein a search range for the second search and onward is wider than a search range for the first search.

* * * * *